(12) United States Patent
Zhang et al.

(10) Patent No.: US 8,731,567 B2
(45) Date of Patent: May 20, 2014

(54) SYSTEM AND METHOD FOR AUTOMATIC FRACTIONAL FREQUENCY REUSE PLANNING

(75) Inventors: Liqing Zhang, Ottawa (CA); Jianglei Ma, Ottawa (CA); Zhijun Chao, Kanata (CA)

(73) Assignee: Futurewei Technologies, Inc., Plano, TX (US)

( * ) Notice: Subject to any disclaimer, the term of this patent is extended or adjusted under 35 U.S.C. 154(b) by 332 days.

(21) Appl. No.: 13/118,239

(22) Filed: May 27, 2011

(65) Prior Publication Data

US 2012/0028664 A1 Feb. 2, 2012

Related U.S. Application Data

(60) Provisional application No. 61/367,898, filed on Jul. 27, 2010.

(51) Int. Cl.
*H04W 40/00* (2009.01)

(52) U.S. Cl.
USPC ....... 455/447; 455/452.2; 455/509; 455/63.3; 455/62; 455/425; 455/522; 455/560; 455/500; 455/67.13; 455/438; 455/450; 455/69; 370/336; 370/345

(58) Field of Classification Search
USPC .............. 455/447, 452.2, 509, 63.3, 62, 425, 455/522, 560, 500, 67.13, 438, 450, 69; 370/336, 345
See application file for complete search history.

(56) References Cited

U.S. PATENT DOCUMENTS

| | | | |
|---|---|---|---|
| 6,128,497 A * | 10/2000 | Faruque | 455/447 |
| 7,412,254 B2 | 8/2008 | Senarath et al. | |
| 2005/0245266 A1 | 11/2005 | Viero et al. | |
| 2007/0155431 A1 | 7/2007 | Munzner et al. | |
| 2007/0280183 A1 | 12/2007 | Cho et al. | |
| 2008/0009244 A1 | 1/2008 | Lee | |
| 2008/0268833 A1 | 10/2008 | Huang et al. | |
| 2009/0061778 A1 | 3/2009 | Vrzic et al. | |
| 2009/0081955 A1 | 3/2009 | Necker | |
| 2009/0092059 A1 | 4/2009 | Fu | |
| 2010/0222003 A1 | 9/2010 | Yoshii et al. | |
| 2010/0246538 A1 | 9/2010 | Kravtsov et al. | |

(Continued)

FOREIGN PATENT DOCUMENTS

| CN | 101009622 A | 8/2007 |
|---|---|---|
| CN | 101360321 A | 2/2009 |

(Continued)

OTHER PUBLICATIONS

Al-Ayyoub, M., et al., Self-regulating Spectrum Management: A Case of Fractional Frequency Reuse Patterns in LTE Networks, IEEE, 2010, 12 pages.

(Continued)

*Primary Examiner* — Amancio Gonzalez
(74) *Attorney, Agent, or Firm* — Slater & Matsil, L.L.P.

(57) ABSTRACT

A system and method for automatic fractional frequency reuse (FFR) planning are provided. A method for controller operations includes determining a group of frequency reuse modes, assigning at least one frequency reuse mode to a controller based on mutual relationship information, where the at least one frequency reuse mode is from the group of frequency reuse modes, and sharing the at least one frequency reuse mode with communications controllers coupled to the controller.

38 Claims, 16 Drawing Sheets

(56) References Cited

U.S. PATENT DOCUMENTS

| | | |
|---|---|---|
| 2010/0267408 A1 | 10/2010 | Lee et al. |
| 2010/0303026 A1 | 12/2010 | Chaudhri et al. |
| 2010/0322227 A1 | 12/2010 | Luo |
| 2010/0323712 A1 | 12/2010 | Guey et al. |

FOREIGN PATENT DOCUMENTS

| | | |
|---|---|---|
| CN | 101472339 A | 7/2009 |
| CN | 101711033 A | 5/2010 |
| CN | 101742612 A | 6/2010 |
| CN | 101765119 A | 6/2010 |
| CN | 101784116 A | 7/2010 |
| EP | 1940188 A1 | 7/2008 |
| EP | 2194741 A1 * | 6/2010 |
| GB | 2433378 A | 6/2007 |
| WO | WO 95-34957 | 12/1995 |
| WO | WO 2009-041040 A1 | 2/2009 |
| WO | WO 2009-052754 A1 | 4/2009 |

OTHER PUBLICATIONS

Fodor, G., et al., "Intercell Interference Coordination in OFDMA Networks and in the 3GPP Long Term Evolution System," Journal of Communications, vol. 4, No. 7, Aug. 2009, pp. 445-453.

Racz, A., et al., "On the Impact of Inter-Cell Interference in LTE," IEEE, 2008, 6 pages.

International Search Report of Patent Cooperation Treaty (PCT), International Application No. PCT/CN2011/075841, date of mailing Oct. 13, 2011, Applicant Huawei Technologies Co., Ltd., et al., 5 pages.

International Search Report of Patent Cooperation Treaty (PCT), International Application No. PCT/CN2011/076008, date of mailing Oct. 13, 2011, Applicant Huawei Technologies Co., Ltd., et al.,5 pages.

Written Opinion of the International Searching Authority, Patent Cooperation Treaty (PCT), International Application No. PCT/CN2011/076008, Applicant Huawei Technologies, Co., Ltd., et al., date of mailing Oct. 13, 2011, 6 pages.

Written Opinion of the Internationsl Searching Authority, Patent Cooperation Treaty (PCT), International Application No. PCT/CN2011/075841, Applicant Huawei Technologies Co., Ltd., et al., date of mailing Oct. 13, 2011, 5 pages.

Extended European Search Report, Application No. PCT/CN2011/075841, Applicant Huawei Technologies Co., Ltd., Mar. 28, 2013, 6 pages.

"Final Office Action," U.S. Appl. No. 13/106,598, mailing date: Sep. 6, 2013, 19 pages.

* cited by examiner ns, UEs in a first
SYSTEM AND METHOD FOR AUTOMATIC FRACTIONAL FREQUENCY REUSE PLANNING This application claims the benefit of U.S. Provisional Application No. 61/367,898, filed on Jul. 27, 2010, entitled "Self-Organized Inter-Cell Interference Coordination (ICIC) Solution," which application is hereby incorporated herein by reference.

TECHNICAL FIELD

The present invention relates generally to digital communications, and more particularly to a system and method for automatic fractional frequency reuse (FFR) planning.

BACKGROUND

Inter-cell interference (ICI) may be considered to be interference at a cell due to transmissions originating in another cell. Usually, ICI occurs between adjacent cells of a communications system. As an example, relatively high-powered transmissions to and from a cell edge user (CEU) operating in a first cell may cause more interference to adjacent cells utilizing the same operating frequency than relatively lower-powered transmissions to and from a cell center user (CCU) operating in the first cell to adjacent cells utilizing the same operating frequency due to correspondingly higher power levels of the transmissions to and from the CEU.

FIG. 1 illustrates a prior art communications system 100. Communications system 100 includes a first enhanced NodeB (eNB) 105 and a second eNB 115. An eNB (also commonly referred to as a base station, communications controller, NodeB, and so forth) may control communications of User Equipment (UE) operating within its coverage area. For example, eNB 105 may have a coverage area illustrated in FIG. 1 as hexagon 110, while eNB 115 may have a coverage area illustrated as hexagon 120. Operating within hexagon 110 may be a first UE 125 and a second UE 130. A UE may also be commonly referred to as a mobile station, user, terminal, subscriber, and so on).

Generally, an eNB, a relay node (RN), a low power node (LPN), or so on, may be referred to as a communications controller. Typically, communications controllers may be sectorized into a number of sectors, with each sector being referred to as a cell, to increase utilization, decrease interference, and so forth. Without loss of generality, a cell, as used herein, may refer to a communications controller, a portion of a coverage area of a communications controller, or the coverage area of the communications controller in its entirety.

A coverage area of an eNB (or more generally, a cell) may be categorized based upon a distance to the eNB. For example, coverage area of eNB 105 (i.e., hexagon 110) may be categorized into two regions, with a first region being a cell center region (shown as circle 135) and a cell edge region (portions of hexagon 110 outside of circle 135, shown as region 140). Normally, with downlink fractional frequency reuse ICIC, UEs operating within a cell center region, such as UE 125, may receive transmissions made at a lower power level than UEs operating outside of a cell center region, such as UE 130, due to their closer proximity to an eNB serving the coverage area.

Furthermore, since transmissions made by UEs (i.e., uplink transmissions) operating with a cell edge region, such as UE 130, are usually made at higher power levels and the UEs are also located closer to neighboring (e.g., adjacent) eNBs, the transmissions may cause more interference to the neighboring eNBs. For downlink transmissions, UEs in a first eNB (e.g., a serving eNB) that are located closer to a neighboring eNB (i.e., an adjacent eNB) may experience high interference from transmissions of the neighboring eNB than UEs operating in a cell center region of the first eNB.

One form of ICIC is fractional frequency reuse (FFR) ICIC. In FFR ICIC, available time and/or frequency resources may be divided up into multiple parts, also commonly referred to as a FFR pattern or frequency reuse pattern, which may be allocated to different transmitters. The transmitters may then transmit only during times and/or in frequencies associated with their allocated time and/or frequency part(s) or transmit with different power densities in different time and/or frequency parts according to predefined power density mask. Assignment of the time and/or frequency parts may be made so that adjacent and/or close transmitters cause little or no interference to one another and/or receivers.

It is widely considered that ICI management will be a key technology for enhancing the performance of Third Generation Partnership Project (3GPP) Long Term Evolution (LTE) compliant communications systems, for example, and overall UE experience Therefore, there is a need for ICI reducing techniques, of which, inter-cell interference coordination (ICIC) is one form. ICIC is a simple and efficient ICI management scheme. Generally, ICIC attempts to reduce and/or control ICI through the use of radio resource management (RRM) methods. Typically, ICIC takes into account information from multiple cells, such as neighboring cells, to control inter-cell interference. A usual ICIC strategy may be to determine resources available at a cell, which may then be scheduled (i.e., allocated) to users. ICIC in Orthogonal Frequency Division Multiple Access (OFDMA) communications systems, such as 3GPP LTE communications systems, have received considerable study.

SUMMARY OF THE INVENTION

These and other problems are generally solved or circumvented, and technical advantages are generally achieved, by example embodiments of the present invention which provide a system and method for self-organized ICIC.

In accordance with an example embodiment of the present invention, a method for controller operations is provided. The method includes determining a group of frequency reuse modes, and assigning at least one frequency reuse mode to a controller based on mutual relationship information, where the at least one frequency reuse mode is from the group of frequency reuse modes. The method also includes sharing the at least one frequency reuse mode with communications controllers coupled to the controller.

In accordance with another example embodiment of the present invention, a method for controller operations is provided. The method includes operating in a first state, operating in a second state, and operating in a third state. Operating in the first state includes transmitting at a first power setting, where at least one communications device coupled to a controller measures interference from other communications controllers. Operating in the second state includes transmitting at a first power setting based on a first operating mode of the controller, and signaling a second power setting to the at least one communications device coupled to the controller, where the second power setting is based on a second operating mode of the controller. Operating in the third state includes transmitting at the second power setting.

In accordance with another example embodiment of the present invention, a controller is provided. The controller includes a frequency reuse select unit, and a transmitter coupled to the frequency reuse select unit. The frequency reuse select unit determines a group of frequency reuse modes, and assigns at least one frequency reuse mode to a controller based on mutual relationship information, where the at least one frequency reuse mode is from the group of frequency reuse modes. The transmitter shares the at least one frequency reuse mode with communications controllers coupled to the controller.

One advantage disclosed herein is that techniques for automated FFR pattern selection allows for elimination of expensive and error-prone manual FFR pattern selection, especially for communications systems with irregular layouts. Automated FFR pattern selection will further improve operating efficiency and reduce operating costs.

A further advantage of exemplary embodiments is that automated FFR pattern optimization techniques allow for optimization of FFR patterns to meet changing communications system operating conditions and configurations. Automated FFR pattern optimization may be made as frequent as desired to meet ICIC performance targets, communications system performance targets, available communications and computational resources, and so forth.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to example embodiments in a specific context, namely a 3GPP LTE compliant communications system. The invention may also be applied, however, to other Orthogonal Frequency Division Multiple Access (OFDMA) communications systems, such as 3GPP LTE-Advanced, WiMAX, IEEE 802.16, and so forth, compliant communications systems.

Existing ICIC techniques include:
  Manual Geo-based reuse-three planning and ICIC configuration: This scheme makes use of cell locations to manually plan a frequency patterns to limit overlapping of three frequency bands. It is very costly to operators and the performance is poor, especially for irregular layouts, due to being location and antenna-direction based.

Fixed FFR reuse-three: This is a commonly used FFR reuse pattern for ICIC control. It has difficulty with frequency planning problems and the three modes are not sufficient to assign non-overlapping patterns when interference scenarios (e.g., large metropolitan areas) and cell neighbor relationship are complicated.

Fixed seven reuse mode: It can provide more colors to complicated interference scenarios but can waste frequency reuse resources to certain regular field layouts when fewer (e.g., three) colors are enough. This reuse mode defines one mode with less interference band for cell edge uses in all other cells, it will cause interference, e.g., when two UEs from two neighbor cells handover to another of their common neighbor cell.

Fractional Frequency Reuse (FFR) is an important ICIC technique for OFDMA system. FFR reduces the interference caused by neighboring cells using the same frequency band and can thus help to increase user throughput and overall network capacity. FFR may be difficult to implement in field areas with complicated interference scenarios, such as, large metropolitan areas. For example, FFR with reuse-three cannot handle frequency planning problems and the three modes may not be sufficient to assign non-overlapping patterns. Therefore, resulting in communications system performance degradation, such as an overall coverage of the communications system and handovers (HO).

Figure 1:
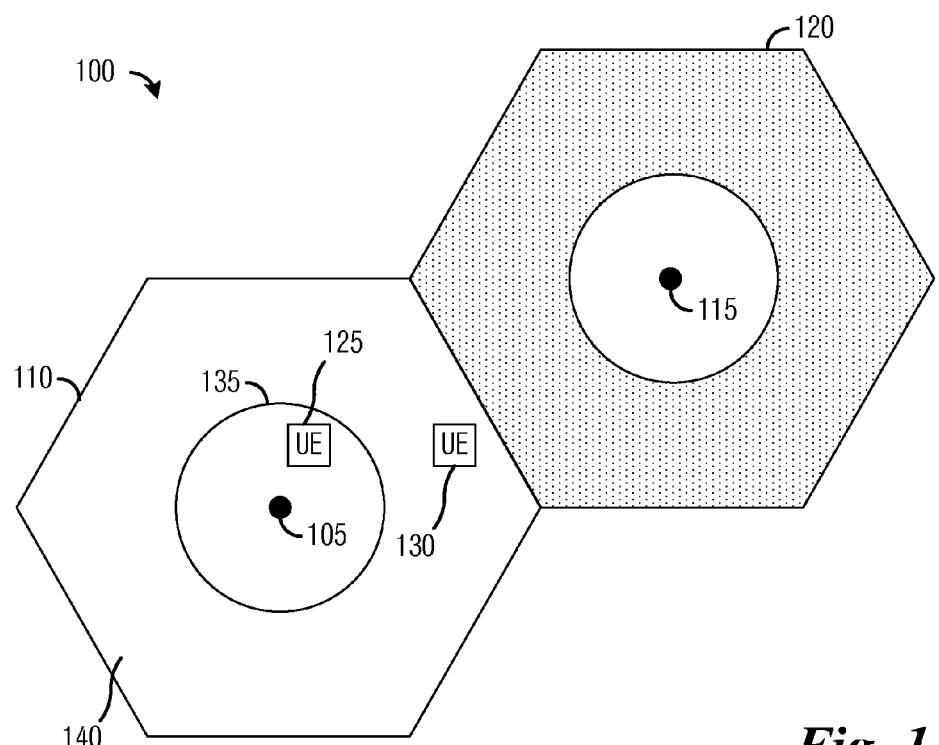
FIG. 1 illustrates an example prior art communications system.
Figure 2:
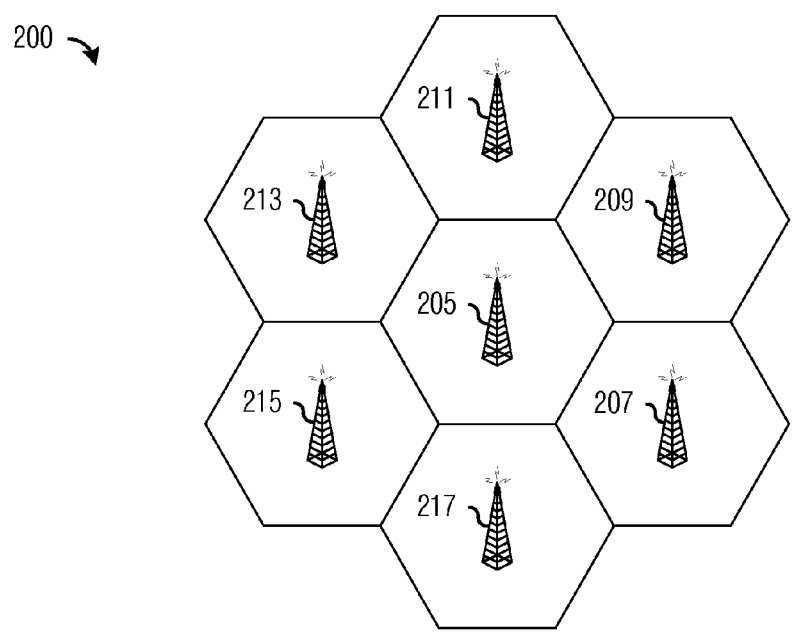
FIG. 2 illustrates an example communications system according to example embodiments described herein.

FIG. 2 illustrates a communications system 200. Communications system 200 includes a number of cells, such as cells 205 through 217. A first-order neighboring cell may be defined as cells that are directly adjacent to one another. As shown in FIG. 2, cells 207 through 217 are first-order neighboring cells of cell 205. A second-order neighboring cell may be defined as cells that are not directly adjacent to one another but are neighboring cells to one common intermediate cell. As shown in FIG. 2, cells 209 and 215 are second-order neighboring cells (through common intermediate cell 205). Similar definitions may be had for higher-order neighboring cells.

Generally, a coverage area of an eNB may be sectorized into a number of sectors in order to increase utilization, decrease interference, and so forth. Each sector may be referred to as a cell. Therefore, without lost of generality, when referring to coverage areas, a cell may be descriptive of a portion of an eNB or the coverage area of the eNB in its entirety.

A system and method for self-organized ICIC may be expected to provide for the following:
Self-organized network with automatic ICIC frequency reuse mode configuration;
Self-optimized network with automatic ICIC performance optimization which may yield improved communications system capacity and coverage, and automatic HO performance enhancement which may result in better HO success rate; and
Self operation and management (O&M) network with ICIC behavior monitoring which may provide automatic ICIC failure detection and correction.

Figure 3:
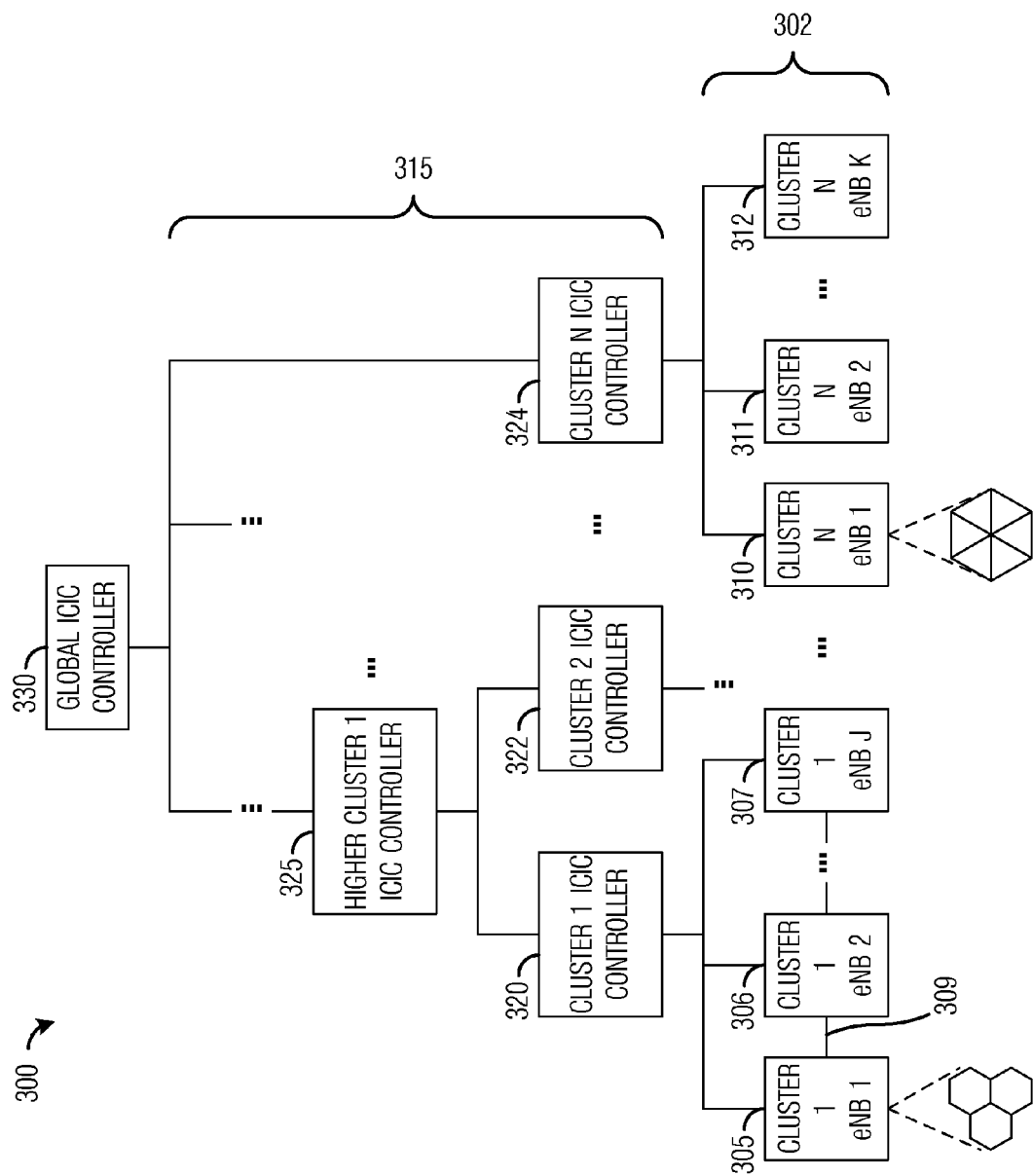
FIG. 3 illustrates an example detailed view of a communications system according to example embodiments described herein.

FIG. 3 illustrates a detailed view of a communications system 300. The architecture of communications system 300 may be hierarchical in design, which may provide a range of ICIC functionality depending upon presence or absence of hardware, a number of performance criteria, such as desired ICIC performance, available computational and/or communications resources, desired communications system performance, and so on.

At a lowest level of communications system 300, referred to as an eNB level 302, there may be eNBs that each perform self-organized intra-eNB ICIC and optimization for cells making up the eNBs. As shown in FIG. 3, there may be multiple eNBs, such as cluster 1 eNBs (including cluster 1 eNB 305 through 307), and cluster N eNBs (including cluster N eNBs 310 through 312).

A subset of eNBs in eNB level 302 may perform inter-eNB self-organized ICIC and optimization. Some eNBs may not perform inter-eNB self-organized ICIC and optimization because there is not a need for inter-eNB ICIC at the eNB or the eNBs are not capable of performing inter-cell self-organized ICIC and optimization. The eNBs may perform ICIC self-organization and optimization independent of other eNBs. As an example, an eNB may select frequency reuse modes for its cells.

According to an example embodiment, the eNB may select the frequency reuse modes for its cells from a group of frequency reuse modes, which may be orthogonal. The group of frequency reuse modes may be determined from resources available to the communications system. The group of frequency reuse modes may be pre-determined or pre-specified and saved for later use. For example, the group of frequency reuse modes may be specified by a technical standard, by an operator of the communications system, or so on.

The frequency reuse mode selection may be made based on measurements made by UEs served by the eNB and may be reported to the eNB. From the reported measurements, the eNB may be able to determine interference from neighboring cells and/or eNBs, which may be used to make the frequency reuse mode selections when inter-eNB ICIC self-organization and optimization is enabled. Information about the interference from neighboring cells may be used to develop neighboring relationship information.

If an inter-eNB interface 309, such as an X2 interface, is available, the eNBs so coupled may be able to share interference information (as well as other neighboring relationship information). The eNBs may then perform distributed ICIC self-organization and optimization making use of the shared interference information (and/or other neighboring relationship information) to make the frequency reuse mode selections. The use of the shared interference information and/or other neighboring relationship information may help the eNBs to make better frequency reuse mode selections.

Above eNB level 302 may be a cluster level 315, which may include groupings of eNBs that may be controlled by cluster ICIC controllers. For example, as shown in FIG. 3, cluster 1 ICIC controller 320 may perform ICIC self-organization and optimization for cluster 1 eNBs 305 through 307, and cluster N ICIC controller 324 may perform ICIC self-organization and optimization for cluster N eNBs 310 through 312. Although its eNBs are not shown in FIG. 3, cluster 2 ICIC controller 322 may perform ICIC self-organization and optimization for one or more eNBs. In general, when a cluster ICIC controller is present, the cluster ICIC controller may perform ICIC self-organization and optimization for cells coupled to the cluster ICIC controller.

In general, when a cluster ICIC controller is available, eNBs coupled to the cluster ICIC controller may provide interference information and/or other neighboring relationship information to the cluster ICIC controller, which may perform ICIC self-organization and/or optimization. For example, the cluster ICIC controller may make frequency reuse mode selections for the eNBs based on the provided interference information and/or other neighboring relationship information, and then after the initial frequency reuse mode selection, the cluster ICIC controller may also perform optimization of the frequency reuse modes to help further improve performance.

According to an example embodiment, the cluster ICIC controller may be used to perform only ICIC optimization. For example, the eNBs coupled to the cluster ICIC controller may perform self-organized ICIC (as described above for a communications system without cluster ICIC controllers). The eNBs may then provide interference information and/or other neighboring relationship information to the cluster ICIC controller and the cluster ICIC controller may make use of the provided interference information and/or other neighboring relationship information to provide a centralized view in ICIC optimization.

According to an example embodiment, if an inter-eNB interface, such as an X2 interface, is available to connect the eNBs also coupled to a cluster ICIC controller, the inter-eNB interface may be used to allow the eNBs to share the interference information and/or other neighboring relationship information to improve the self-organized ICIC performed by the eNBs. However, the cluster ICIC controller may still be used to provide a centralized view in ICIC optimization. For example, a cluster ICIC controller may be used to resolve conflicts between eNBs coupled to the cluster ICIC controller after an X2 interface based distributed self-organized ICIC has been performed.

An advantage of cluster ICIC controllers may be increased flexibility and simplicity in ICIC. For example, a particular portion of communications system 300 may suffer from additional interference or has a complex structure. A cluster ICIC controller coupled to eNBs operating within the particular portion of communications system 300 may allow for the use of an advanced ICIC algorithm to help perform ICIC or assist in performing ICIC within the particular portion of communications system 300 only. While other portions of communications system 300 may not need the use of an advanced ICIC algorithm or any ICIC at all.

There may be multiple levels of cluster ICIC controllers. As an example, higher cluster 1 ICIC controller 325 may couple cluster 1 ICIC controller 320 and cluster 2 ICIC controller 322 and perform ICIC self-organization and optimization for cluster 1 ICIC controller 320, cluster 2 ICIC controller 322, cluster 1 eNBs 305 through 307, as well as eNBs coupled to cluster 2 ICIC controller 322. Higher cluster ICIC controllers may perform ICIC self-organization and optimization for ICIC controllers and eNBs coupled to them. However, cluster N ICIC controller 324 is not coupled to a higher cluster ICIC controller.

The higher cluster ICIC controllers may perform ICIC for the cluster ICIC controllers and/or eNBs coupled to them. The higher cluster ICIC controllers may perform ICIC for a larger region, such as a metropolitan area. The multiple levels of regional cluster controllers may be considered to be providers of ICIC for larger and larger regions. Cluster controllers may also provide slow (e.g., at an hourly, daily, and so forth, level) ICIC frequency reuse optimization without placing undue computational and/or communications load on eNBs.

According to an example embodiment, a number of levels in cluster level 315, which may range from zero to one, two, three, four, or more, may be dependent on ICIC criteria, such as a level of ICIC infrastructure investment, desired level of ICIC performance beyond a neighborhood scope, availability of communications infrastructure (for interaction between ICIC participants, for example), desired overall communications system performance level, and so forth.

Above cluster level 315 (or eNB level 302 if cluster level 315 is not present), a global ICIC controller 330 may be used to provide ICIC for devices coupled to it. Global ICIC controller 330 may also be referred to as an Operations Support System (OSS) module. Global ICIC controller 330 may provide low level ICIC operation, such as frequency reuse organization, ICIC optimization, and O&M. Furthermore, global ICIC controller 330 may provide coordination, planning, and information sharing between devices coupled to it, especially for those devices that are not first- or second-order neighbors of one another and communications may be difficult, expensive, slow, or so on. Global ICIC controller 330 may also provide for inter-cluster eNB, inter-cluster controller, or global coordination even when inter-eNB interface(s), such as an X2 interface, is not available.

The hierarchical structure of the architecture of communications system 300 may allow for a flexible level of ICIC performance. As an example, cluster 1 ICIC controller 320 and cluster 2 ICIC controller 322 may be coupled to higher cluster 1 ICIC controller 325, while cluster N ICIC controller 324 may not be. For discussion purposes, consider that cluster 1 ICIC controller 320 and cluster 2 ICIC controller 322 are used to perform ICIC operations for two busy areas that are closely located so there may be interaction between the two (and hence the presence of higher cluster 1 ICIC controller 325, while cluster N ICIC controller 324 may be used to perform ICIC operations for a distant area).

The hierarchical structure of the architecture of communications system 300 may also allow for flexibility in the addition of additional devices, such as eNBs, cluster ICIC controllers, higher cluster ICIC controllers, and so forth, as the needs of communications system 300 changes through time as subscribers change, move around, and so forth. For discussion purposes, consider a situation wherein the area controlled by cluster N ICIC controller 324 grows larger and larger to a point where a new cluster ICIC controller needs to be added. Then, a higher cluster ICIC controller may be added to perform ICIC operations for cluster N ICIC controller 324 and the newly added cluster ICIC controller.

In general, ICIC operations may occur with or without an inter-eNB interface, such as an X2 interface. Without the inter-eNB interface, intra-eNB dynamic ICIC may be performed with fast frequency reuse mode selection negotiation and coordination. Inter-eNB frequency reuse mode configuration may be performed with cluster controller. Additionally, slow ICIC frequency reuse optimization through an ICIC controller in a centralized approach may be used. Frequency reuse mode optimization and frequency reuse bandwidth optimization may be performed. Furthermore, coordinated resource block blocking for partially loaded or unbalanced loaded communications systems may be performed without high speed signaling.

Figure 4:
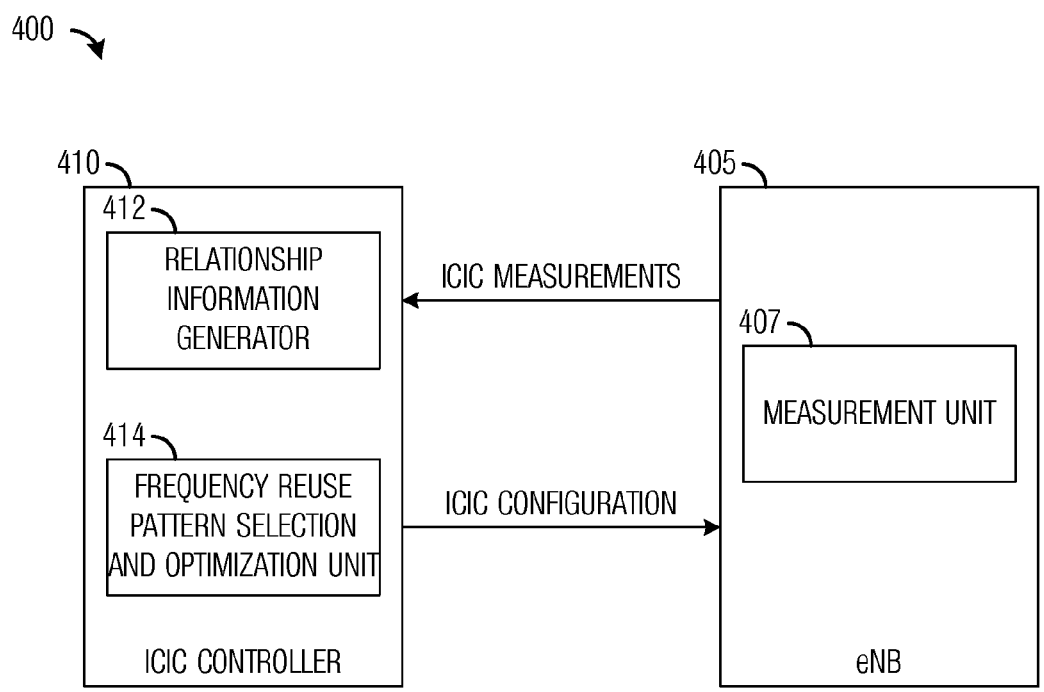
FIG. 4 illustrates an example diagram of a communications system, wherein an information exchange between a cell and its ICIC controller is highlighted according to example embodiments described herein.

FIG. 4 illustrates a diagram of a communications system 400, wherein an information exchange between an eNB and its ICIC controller is highlighted. An eNB 405 is shown in FIG. 4 in operation with an ICIC controller 410. ICIC controller 410 may be a cluster level ICIC controller or a global ICIC controller.

A measurement unit 407 in eNB 405 may be used to coordinate measurements of interference at UEs served by eNB 405. For example, measurement unit 407 may coordinate measurements using radio resource measurements (RRM). ICIC measurements derived from measurements coordinated by measurement unit 407 of eNB 405 may be provided to ICIC controller 410 and may be used to determine relationship information for eNB 405 by a relationship information generator 412. As an example, relationship information generator 412 may use the ICIC measurements from eNB 405 to determine neighbor relationship information, including neighbor relationship tables, for eNB 405 and its neighboring eNBs and/or cells.

The relationship information, such as the neighbor relationship tables, for eNB 405 and its neighboring eNBs and/or cells may be used by a frequency reuse mode selection and optimization unit 414 to select frequency reuse modes, such as FFR modes, for eNB 405 and its neighboring eNBs and/or cells. In addition to selecting the frequency reuse modes, frequency reuse mode selection and optimization unit 414 may also perform frequency reuse mode optimization. Frequency reuse mode optimization may adjust frequency reuse mode assignments, for example, to meet changing communications system conditions. For instance, as a traffic load and/or traffic pattern of the communications system changes, changes in UEs served (e.g., UEs are added and/or removed)), changes in interference environment (e.g., a new interferer presents self in the communications system), and so forth, frequency reuse mode optimization may adjust frequency reuse mode assignments to meet changing conditions.

ICIC configuration information (generated by frequency reuse mode selection and optimization unit 414) may be provided to eNB 405, which may then adjust its behavior based on the ICIC configuration information. ICIC configuration information may include selected frequency reuse mode(s) for eNB 405 as well as usage information, such as available transmission times, transmission power levels, modulation and coding schemes, UE classifications (such as CEU, CCU, and so on) assigned to which frequency reuse mode(s), and so on.

According to an example embodiment, frequency reuse mode optimization may occur at scheduled intervals, specified time events, or upon occurrence of a trigger event. Examples of trigger events may include: interference at a cell or cells (or eNB or eNBs) meets a threshold, an error rate for one or more cells (or one or more eNBs) meeting a threshold, a data rate for one or more UEs failing to meet a target data rate by more than a specified amount or for a specified period of time, a detection of a specified number of UE additions and/or deletions, a detection of a specified number of handover failures, a detection of a change in an interferer, receiving an instruction to perform frequency reuse mode optimization, or so forth.

According to an example embodiment, although FIG. 4 illustrates eNB 405 sharing ICIC measurements with ICIC controller 410. However, eNB 405 may share ICIC measurements with multiple ICIC controllers, such as those that are higher up (as well as lower down) in a hierarchy than ICIC controller 410. For example, referencing FIG. 3, an eNB (for example, cluster 1 eNB 1 305) may share its ICIC measurements with multiple ICIC controllers, including cluster 1 ICIC controller 320, higher cluster 1 ICIC controller 325, and global ICIC controller 330.

Figure 5A:
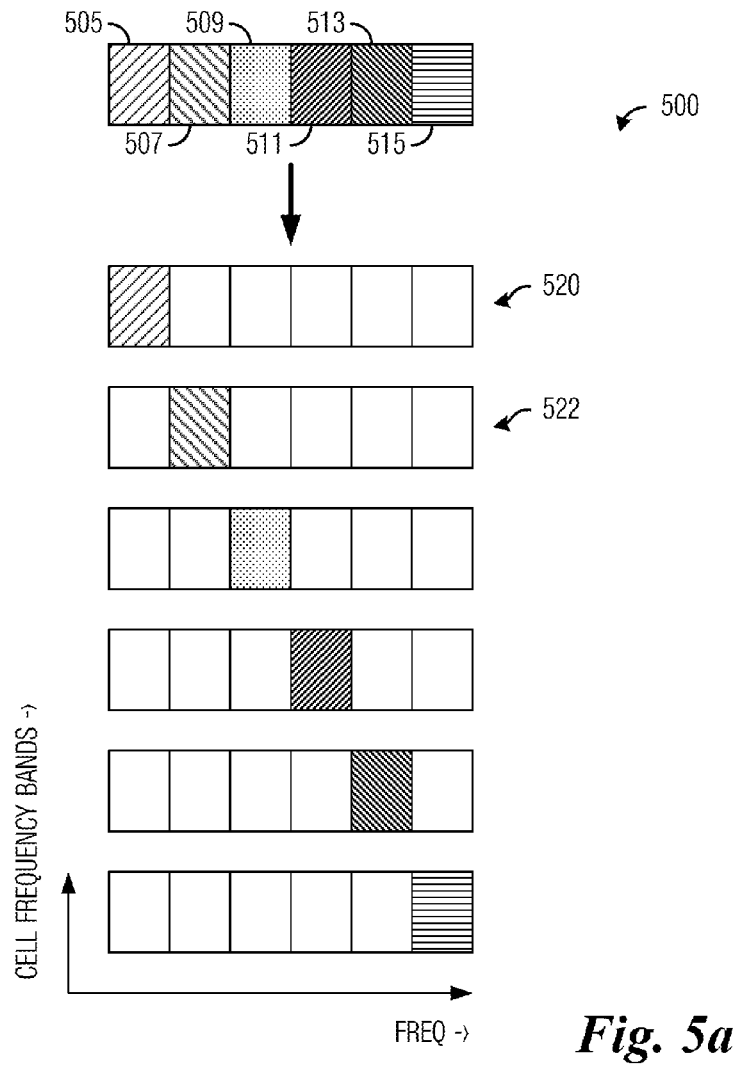
FIG. 5a illustrates an illustrative embodiment of a frequency reuse frequency arrangement for a frequency range according to example embodiments described herein.

FIG. 5a illustrates an illustrative embodiment of a frequency reuse frequency configuration 500 for a frequency range. Frequency reuse frequency configuration 500 for the frequency range, as shown in FIG. 5a, includes six different frequency bands: first frequency band 505, second frequency band 507, third frequency band 509, fourth frequency band 511, fifth frequency band 513, and sixth frequency band 515.

One technique that may be used to reduce interference between cells is to have each of the cells transmit only in one frequency band. For example, a first cell may transmit only in first frequency band 505 (shown as frequency reuse frequency configuration 520), while a second cell may transmit only in second frequency band 507 (shown as frequency reuse frequency configuration 522), and so on.

Although shown in FIG. 5a as being divided into six different frequency bands, it may be possible to divide an available frequency range into any number of frequency bands. Furthermore, the frequency bands do not have to be equal in size. As an example, some frequency bands may be larger than others, with the larger frequency bands being assigned to higher priority cells or cells supporting UE with higher priority. Similarly, time may also be used to further divide available resources. Additionally, a combination of both frequency and time may be used to divide available resources. Therefore, the illustrative embodiment of a frequency range being divided into six frequency bands of equal size should not be construed as being limiting to either the scope or the spirit of the example embodiments.

Figure 5B:
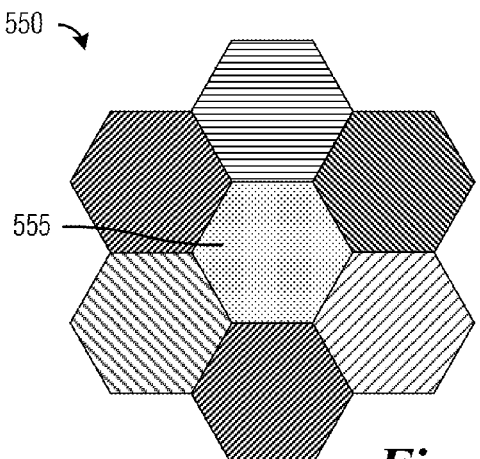
FIG. 5b illustrates an example assignment of the frequency reuse frequency arrangements shown in FIG. 5a to a cell with a number of neighboring cells, wherein shapes and shading of shapes in FIG. 5a and FIG. 5b correspond to one another according to example embodiments described herein.

FIG. 5b illustrates an exemplary assignment 550 of the frequency reuse frequency arrangements shown in FIG. 5a to a cell with a number of neighboring cells, wherein a shading of shapes in FIG. 5a corresponds to a shading of shapes in FIG. 5b. As shown in FIG. 5b, cell 555 may be assigned to transmit in third frequency band 509, and cells 557 and 559 may be assigned to transmit in fourth frequency band 511, and so on. The assignments of the frequency reuse frequency configurations to cells are such that no two adjacent cells (i.e., first-order neighboring cells) use the same frequency reuse frequency configuration. Hence, in most cases, no cell has an overpowering source of interference.

Other frequency reuse frequency configuration assignments are possible and the exemplary assignment 550 shown in FIG. 5b is intended to be an illustrative embodiment and not an exhaustive illustration of possible assignments.

Figure 6:
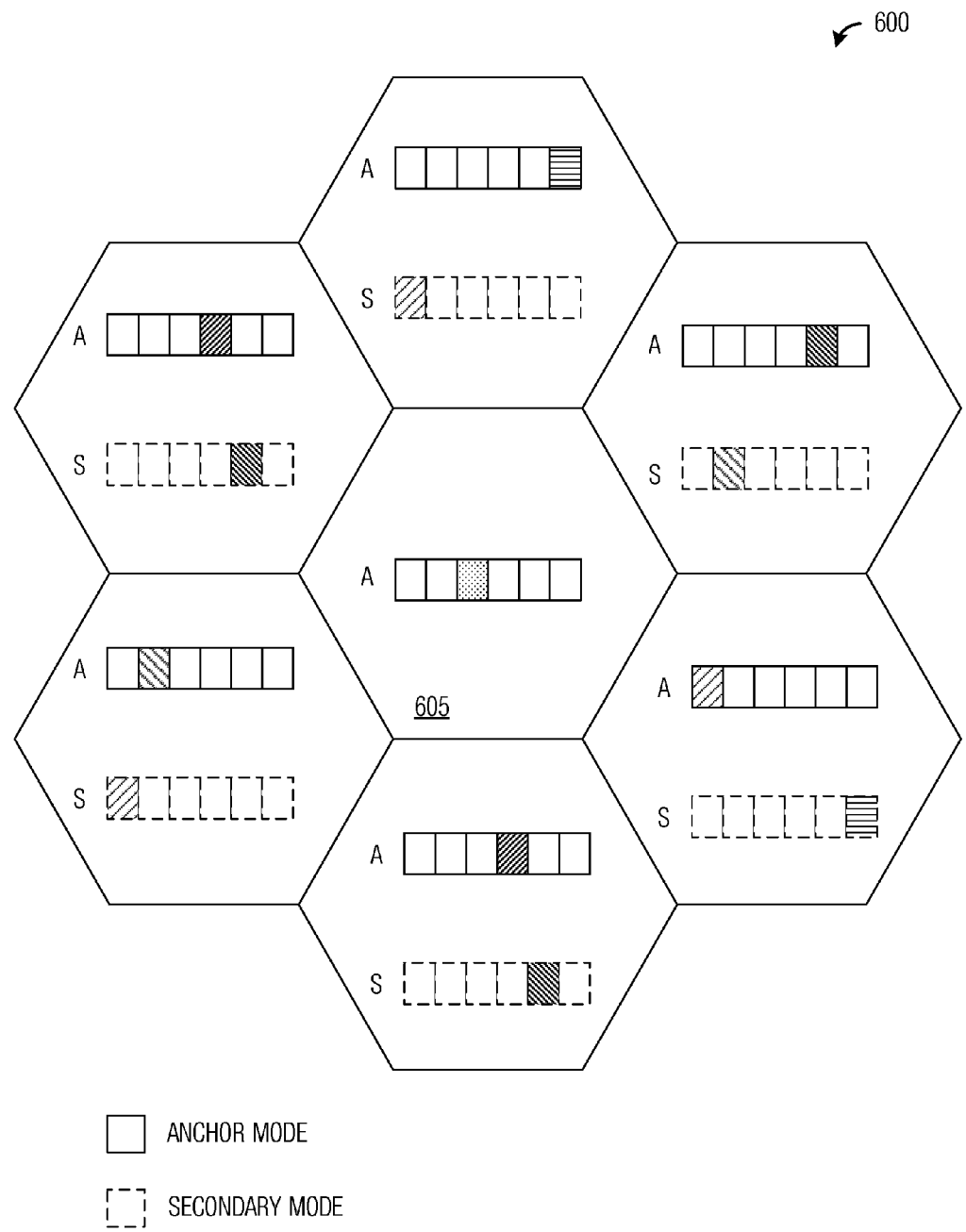
FIG. 6 illustrates an illustrative embodiment of a frequency reuse assignment pattern for a cell and its neighboring cells according to example embodiments described herein.

FIG. 6 illustrates an illustrative embodiment of a frequency reuse assignment pattern 600 for a cell 605 and its neighboring cells. As shown in FIG. 6, frequency reuse assignment pattern 600 includes an assignment of two frequency reuse arrangements (or simply, frequency reuse mode) for each neighboring cell of cell 605. The frequency reuse arrangement assignments shown in FIG. 6 are non-overlapping. Overlapping assignments may also be made, but are not shown herein.

For a cell with two frequency reuse modes, a first frequency reuse mode may be referred to as an anchor mode (shown in FIG. 6 as "A") and a second frequency reuse mode may be referred to as a secondary mode (shown in FIG. 6 as "S"). According to an example embodiment, the anchor mode of a cell may be used as a primary high power frequency band for basic ICIC operation and for handover enhancement, while the secondary mode may be used as a high power band for potential frequency reuse optimization. According to an example embodiment, each cell may have a different optimal frequency reuse factor for the anchor mode, such as reuse-1, reuse-3, reuse-6, and so on. The illustrative embodiment shown in FIG. 6 has a frequency reuse mode with a frequency reuse factor of 1/6 (or reuse-6) for the anchor mode.

The secondary mode may be self-selected by the cells during frequency reuse optimization and may be based on shared information, such as relationship information. Additionally, the optimal frequency reuse modes may be different in different regions of a communications system, especially in a communications system with different cell sectorization configurations in different regions.

Mutual relationship information may be a key component in ICIC self-organization and optimization. Mutual relationship information may provide information related to interference at a cell from its neighboring cells (typically first-order neighboring cells, but information for higher-order neighboring cells may also be included and used). Mutual relationship information for the cell may be generated from information provided by UEs served by the cell. The mutual relationship information may be used by the eNBs, cluster ICIC controllers, higher cluster ICIC controllers, global ICIC, and so forth, to perform ICIC self-organization and optimization, such as frequency reuse mode planning, frequency reuse optimization, and so on.

Generally, an eNB may have a single set of mutual relationship information for both uplink and downlink channels. However, separate sets of mutual relationship information for the uplink and the downlink channels may be possible.

Figure 7:
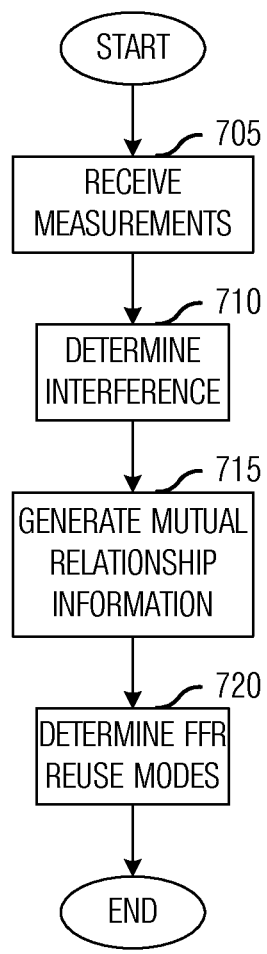
FIG. 7 illustrates an example flow diagram of operations in determining frequency reuse modes based on mutual relationship information according to example embodiments described herein.

FIG. 7 illustrates a flow diagram of operations 700 in determining frequency reuse modes based on mutual relationship information. Operations 700 may be indicative of operations occurring in an eNB of a communications system as the eNB determines frequency reuse modes using a mutual relationship information as well as information based on the mutual relationship information. Operations 700 may occur while the eNB is in a normal operating mode and is initially performing ICIC, i.e., ICIC self-organization.

Operations 700 may begin with the eNB receiving signal power measurement reports from UEs served by the eNB (block 705). According to an example embodiment, the UEs served by the eNB may measure a reference signal (e.g., a pilot signal) transmitted by cell(s) of the eNB and report signal power measurements back to the cell. The UEs may measure the reference signal over an extended period of time to potentially provide a better indication of interference experienced by the UEs. UEs may also report to their serving eNB the interference levels of neighboring cells by measuring the pilot signals of the neighboring cells, for example. The UEs may notify report the measurements to their serving eNB in the form of a Reference Signal Received Power (RSRP) report.

The eNB may determine an interference level experienced by the UEs based on the signal power measurement reports received from the UEs (block 710). According to an example embodiment, the eNB may apply weights to the signal power measurement reports provided by the UEs. For example, the eNB may apply weights based on factors such as UE distribution, UE distance, UE priority, UE capability (in terms of measurements, for example), inter-cell interference distribution, and so on.

In addition to the signal power measurement reports from the UEs, the eNB may also make use of additional information from other sources. As an example, the eNB may also make use of downlink UE categorization based on the signal power measurement reports as well as cell edge user and/or cell center user distribution information. Furthermore, the eNB may also make use of channel quality reports, such as channel quality indicators (CQI), from the UEs, as well as other forms of channel quality information.

From the interference level experienced by the UEs, the eNB may generate neighbor information (also block 710). The neighbor information may be information pertaining to neighbors of the eNB, and may include interference information (as well as other types of information, including geographical information) about first-order neighbors, second-order neighbors, and so on, which cause non-zero interference to the eNB. According to an example embodiment, the neighbor information may be generated from the signal power measurement reports provided by the UEs.

The eNB may generate mutual relationship information from the neighbor information (block 715). As an example, the eNB may be able to derive from the neighbor information the strongest sources of interference, which may tend to be first-order neighbors. Weaker sources of interference may be second-order (or higher) neighbors, low-power neighbors, or so on. For macro cells (a form of full power cell, such as an eNB, base station, and so forth, that is part of a planned communications system deployed by an operator of the communications system), the eNB may also know at least a general location of the macro cell. For low-power cells, the eNB may be able to determine an estimate of the location of the low-power cell from the signal power measurement reports, the interference levels, and so forth. Generally, the mutual relationship information is a subset of the neighbor information of the eNB.

The eNB may also make use of neighbor information from neighboring cells. Information from neighboring cells may be used by the eNB to generate its own mutual relationship information or enhance its own mutual relationship information. As an example, the eNB may make use of information from the neighbor information of the neighboring cells if the neighbor information from the neighboring cells contains information about neighboring cells that are in the eNB's neighbor information.

The neighbor information may be exchanged with neighboring cells through neighbor information relationship messages. If the eNBs have an inter-eNB interface, such as an X2 interface, then the neighbor information relationship messages may be transmitted more quickly and perhaps with more frequency. If there isn't an inter-eNB interface, then the neighbor information relationship messages may be exchanged with less frequency or not at all.

The frequency reuse modes may be determined from the mutual relationship information (block 720). Different ICIC algorithms may be supported in a single communications system, such as dynamic ICIC with and/or without an inter-eNB interface. According to an example embodiment, if no inter-eNB interface and/or ICIC cluster controllers are available, the eNB may perform intra-eNB frequency reuse mode self-configuration and optimization. The eNB may determine the frequency reuse modes of the cells controlled by it based on intra-eNB mutual relationship information. For example, the cell may be assigned frequency reuse modes to avoid interference to the neighboring cells.

According to an example embodiment, if ICIC cluster controller(s) are available, the eNB may report their mutual relationship information to their respective ICIC cluster controller(s), with the ICIC cluster controller(s) potentially further reporting the mutual relationship information if applicable. The frequency reuse mode configuration and optimization may be performed in the ICIC cluster controller(s) and reported back to the eNBs coupled to the ICIC cluster controller(s). If an inter-eNB interface is available, fast information exchange and fast ICIC optimization may be performed in the eNBs, while the ICIC controller(s) may perform frequency reuse mode self-organization and slow optimization.

According to an example embodiment, if an inter-eNB interface is available and no ICIC cluster controller(s) are available, the inter-eNB interface may be used to exchange information between the eNBs and enable frequency reuse mode self-organization and slow or fast ICIC optimization.

Operations 700 may also be used to optimize frequency reuse modes once the communications system is in operation and operating conditions change, thereby causing frequency reuse modes selected during ICIC self-organizing to no longer mitigate interference as well as they originally did. For example, operations 700 may be repeated as UE distributions change, communications system traffic load and/or distribution change, number of UE change, a fault in an entity in the communications system is detected or corrected, or so forth.

According to an alternative embodiment, ICIC self-organization and optimization may occur at an ICIC controller other than an eNB, for example, a cluster ICIC controller, a higher cluster ICIC controller, or a global ICIC controller. When ICIC self-organization and optimization occur at an ICIC controller other than an eNB, the eNBs may still perform parts of operations 700 with possible exception of determining frequency reuse modes (block 720).

Instead of (or in addition to) determining frequency reuse modes (block 720), the eNBs may send mutual relationship information to the ICIC controller (e.g., a cluster ICIC controller, a higher cluster ICIC controller, or a global ICIC controller) and the ICIC controller may perform ICIC self-organization and optimization, e.g., determine frequency reuse modes. Since the ICIC controller has mutual relationship information for the cells coupled to it, the ICIC controller may be able to perform ICIC self-organization and optimization that is optimal or regionally optimal.

According to an example embodiment, if there are no ICIC controllers other than eNBs (i.e., if there are no cluster ICIC controllers, higher cluster ICIC controllers, or global ICIC controllers), but if there is an inter-cell interface between cells, then the neighbor relationship information may be shared between the eNBs. The sharing of the mutual relationship information may allow for the eNBs to potentially perform better ICIC self-organization and optimization.

ICIC operation typically does not stop once the frequency reuse modes have been selected (as described above). Due to changing conditions, such as communications system load, communications system traffic, UE mobility, faults, and so forth, it may be possible that frequency reuse modes selected in ICIC self-organization may no longer provide optimal performance. Therefore, there may be a need to perform ICIC frequency reuse mode optimization while the communications system is already in operation.

According to an example embodiment, ICIC frequency reuse mode optimization may occur at a time event (e.g., periodic intervals, prespecified times, etc.), upon an occurrence of a trigger event, or combinations thereof. Examples of trigger events may include estimated interference at one or more cells exceeding an interference threshold, error rates of transmissions at one or more cells exceeding an error threshold, handovers failure rates at one or more cells exceeding an handover threshold, receipt of an instruction to perform ICIC frequency reuse mode optimization, or so on.

According to an example embodiment, ICIC frequency reuse mode optimization may occur in a centralized manner, such as in a cluster ICIC controller, a higher cluster ICIC controller, a global ICIC controller, or combinations thereof, or in a distributed manner, such as in cells, cluster ICIC controllers, higher cluster ICIC controllers, or combinations thereof. According to another example embodiment, ICIC frequency reuse mode optimization may occur in a combination of centralized manner and distributed manner.

Figure 8:
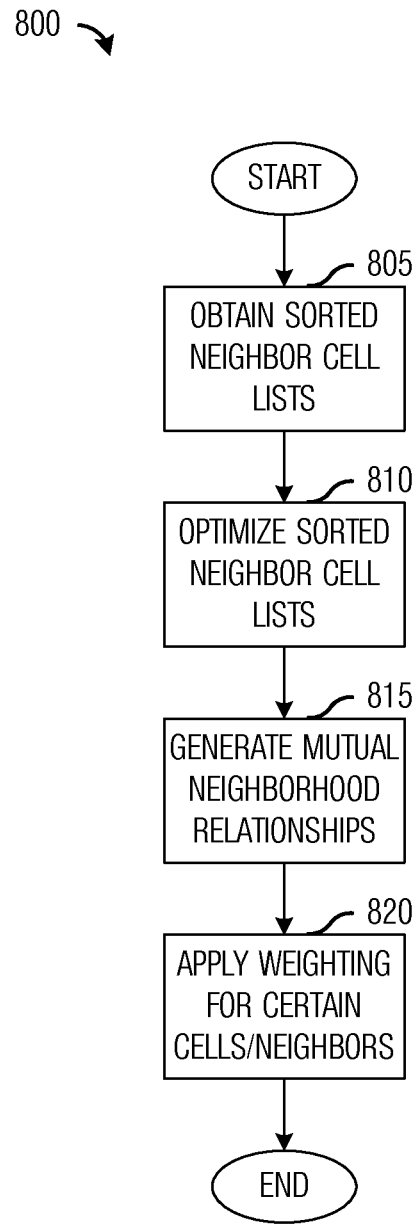
FIG. 8 illustrates an example flow diagram of operations in generating mutual relationship information according to example embodiments described herein.

FIG. 8 illustrates a flow diagram of operations 800 in generating mutual relationship information. Operations 800 may be indicative of operations occurring in an eNB as the eNB generates mutual relationship information for use in selecting frequency reuse modes. Operations 600 may occur while the eNB is in a normal operating mode. Operations 800 may be an implementation of blocks 710 (determine interference) and 715 (generate mutual relationship information) of operations 700 shown in FIG. 7.

Operations 800 may begin with the eNB obtaining neighbor lists (block 805). The eNB may generate its own neighbor list from signal power measurement reports from UEs that it is serving.

From the signal power measurement reports from its UEs, the eNB may generate its own neighbor list by calculating an estimated interference from the signal power measurement reports. According to an example embodiment, the estimated interference may be a weighted sum-interference cost function at time t from a neighbor cell i to eNB j, where eNB j is the eNB generating the neighbor list and cell i is a neighbor cell of eNB j.

The eNB may also exchange neighbor lists from its neighbor cells, where the eNB may share its neighbor list with its neighbor cells and the neighbor cells may share their neighbor lists with the eNB.

The eNB may optimize the neighbor lists (block 810). According to an example embodiment, optimization of the neighbor lists may include the eNB sorting the neighbor lists based on contribution to a total interference estimated at the eNB. Furthermore, optimization of the neighbor lists may include removing some neighbor cells from the list if the neighbor cell's contribution to the total interference estimated at the eNB is less than a threshold. The eNB may optimize its own neighbor list as well as the neighbor lists provided by the neighboring cells.

As an example, neighbor cells may be removed from the neighbor lists if their contribution to the total interference estimated is less than a specified percentage. Alternatively, the eNB may eliminate a specified number or percentage of neighbor cells. For example, the eNB may eliminate the M lowest interfering cells or the N percent of the lowest interfering cells, where M and N are agreed upon values.

The eNB may generate mutual relationship information from the neighbor lists (block 815). According to an example embodiment, the eNB may generate the mutual relationship information from its own neighbor list and the neighbor list from the neighboring cells.

The eNB may apply weights to the mutual relationship information, wherein certain weights may be applied to entries in the mutual relationship information due to geography based considerations (block 820). The weights applied by the eNB may be used to give more weight to cells that may be having performance problems, such as handovers.

According to an example embodiment, cells that have the highest interference levels may be given priority in selecting frequency reuse mode and ICIC coordination. Prioritizing may be especially important in a centralized implementation, such as when mutual relationship information generation by a cluster ICIC controller, a higher cluster ICIC controller, a global ICIC controller, or combinations thereof.

Figure 9:
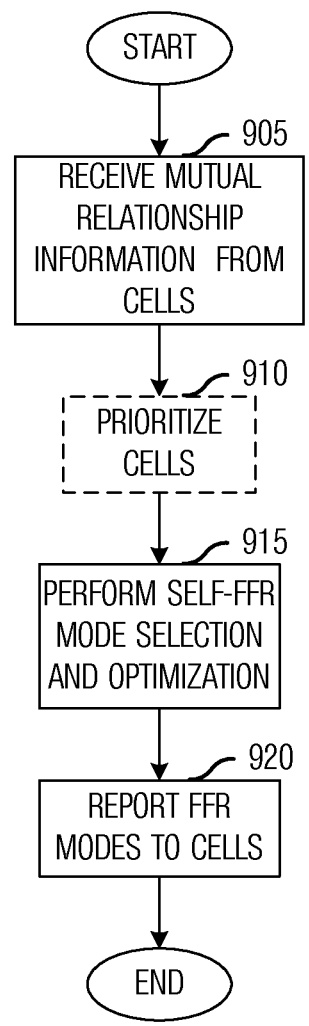
FIG. 9 illustrates an example flow diagram of operations in ICIC frequency reuse mode selection and optimization in a centralized manner according to example embodiments described herein.

FIG. 9 illustrates a flow diagram of operations 900 in ICIC frequency reuse mode selection and optimization in a centralized manner. Operations 900 may be indicative of operations occurring in an ICIC controller, such as a cluster controller, a higher cluster controller, or a global ICIC controller, as the ICIC controller performs ICIC frequency reuse mode selection and optimization to meet changing operating conditions. Operations 900 may occur while the ICIC controller is in a normal operating mode.

Operations 900 may begin with the ICIC controller receiving mutual relationship information from eNBs (block 905). The ICIC controller may optionally prioritize the eNBs (block 910). According to an example embodiment, the ICIC controller may prioritize the eNBs based on the amount of interference that the eNBs receive, and select ICIC frequency reuse modes starting with the eNBs with the most interference, for example. Furthermore, the eNBs with the most interference may also be given priority when there are conflicts in selected ICIC frequency reuse modes. In addition to cell interference, other factors that may be used in conflict resolution include UE priority, UE distribution, geographical information, cell priority, and so on.

The ICIC controller may perform self-frequency reuse mode selection and optimization for the eNBs (block 915). According to an example embodiment, the ICIC controller may perform the self-frequency reuse mode selection and optimization based on a prioritized list of eNBs, such as generated in block 910. The ICIC controller may report the ICIC frequency reuse modes selected for the eNBs to the eNBs (block 920) and the communications system may resume normal ICIC operations.

Figures 10A, 10B:
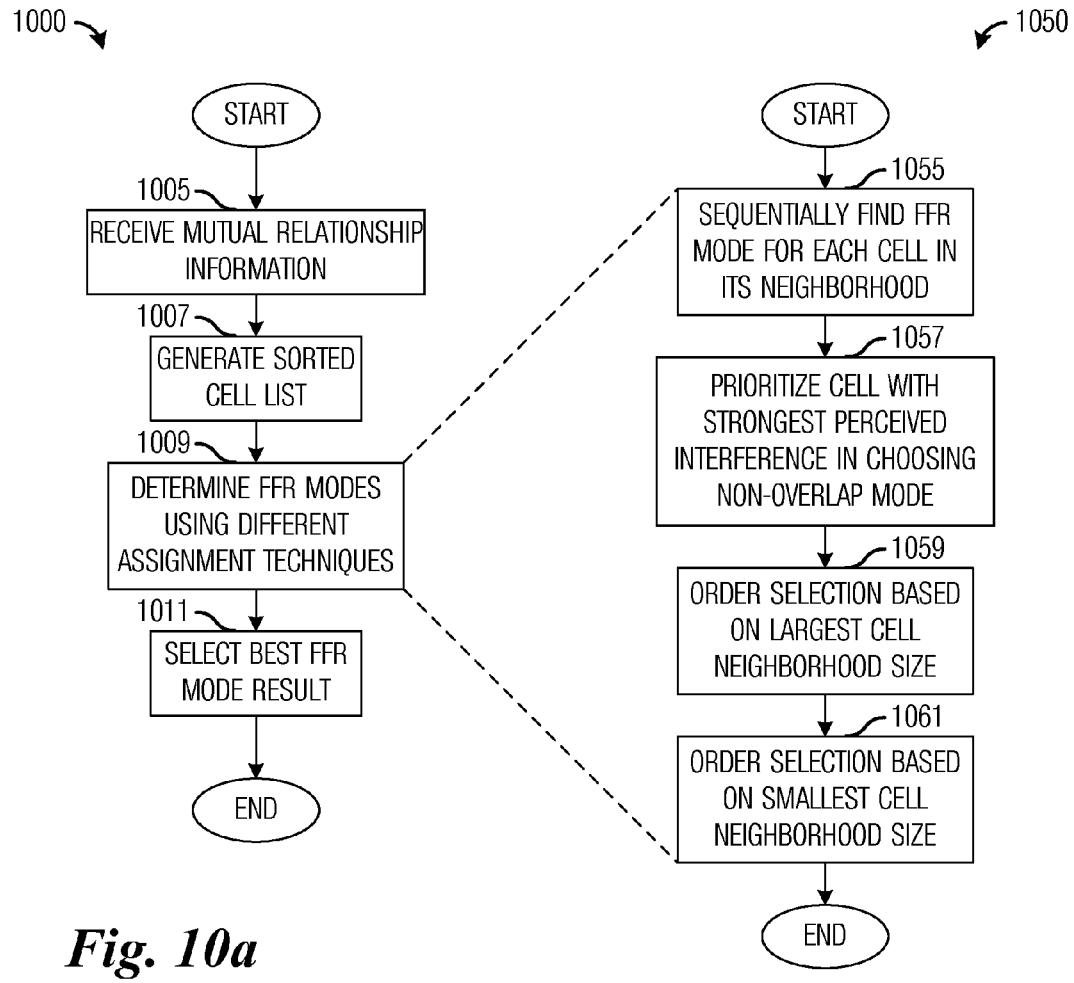
FIG. 10a illustrates an example flow diagram of operations in centralized ICIC frequency reuse mode selection and optimization according to example embodiments described herein.
FIG. 10b illustrates an example flow diagram of operations in selecting frequency reuse mode assignments using a number of different assignment techniques according to example embodiments described herein.

FIG. 10*a* illustrates a flow diagram of operations 1000 in centralized ICIC frequency reuse mode selection and optimization. Operations 1000 may be indicative of operations occurring in an ICIC controller, such as a cluster controller, a higher cluster controller, or a global ICIC controller, as the ICIC controller performs ICIC frequency reuse mode selection optimization to meet changing operating conditions. Operations 1000 may occur while the ICIC controller is in a normal operating mode.

Operations 1000 may begin with the ICIC controller receiving mutual relationship information from eNBs (block 1005). According to an example embodiment, the ICIC controller may receive the mutual relationship information from eNBs coupled to the ICIC controller. The mutual relationship information received from the eNBs may be in the form of neighbor list interference contributions, sorted neighbor list interference contributions, raw interference information, or so on.

The ICIC controller may generate a sorted cell list utilizing the received mutual relationship information from the eNBs (block 1007). As an example, the ICIC controller may generate the sorted cell list from perceived interference information provided by the individual eNBs.

The ICIC controller may determine frequency reuse modes using one or more assignment techniques, wherein the determining is based on the sorted cell list (block 1009). As an example, the ICIC controller may use one or more of the following listed assignment techniques to determine frequency reuse mode assignments and if more than one assignment technique is used, the ICIC controller may select one of the frequency reuse mode assignments from the results of the different assignment techniques. FIG. 10*b* illustrates a flow diagram of operations 1050 in selecting frequency reuse mode assignments using a number of different assignment techniques. The assignment techniques include:

Sequential (block 1055): Based on a cell's identifier. Each cell finds a non-overlapping frequency reuse mode in its cell neighborhood group. Cell ordering may be random and then the frequency reuse mode selection may be performed based on the ordering.

Interference Level (block 1057): Based on a cell's interference level. Cell with the highest cell perceived interference level has the highest priority in choosing a non-overlapping frequency reuse mode. The cell also assigns the non-overlapping modes for a number of strong neighboring cells.

Neighborhood Size A (block 1059): Based on a cell's neighborhood size. Cell with largest neighborhood size has the highest priority in choosing a non-overlapping frequency reuse mode. The cell also assigns the non-overlapping modes for a number of neighboring cells.

Neighborhood Size B (block 1061): Based on a cell's neighborhood size. Cell with smallest neighborhood size has the highest priority in choosing a non-overlapping frequency reuse mode. The cell also assigns the non-overlapping modes for a number of neighboring cells.

Operations 1050 illustrate a serial application of the assignment techniques. However, the assignment techniques may be performed in parallel or a combination of both serial and parallel.

Referencing back to FIG. 10*a*, as discussed above, the ICIC controller may select a frequency reuse mode assignment from the results of the different assignment techniques (block 1011). According to an example embodiment, the ICIC controller may select the frequency reuse mode assignment from the results based on a frequency reuse mode selection criteria, which may include lowest maximum perceived interference at any cell, lowest average perceived interference at all cells, lowest maximum interference caused, lowest average interference caused, lowest maximum weighted interference at any cell, lowest maximum weighted interference caused, and so on.

Figure 11:
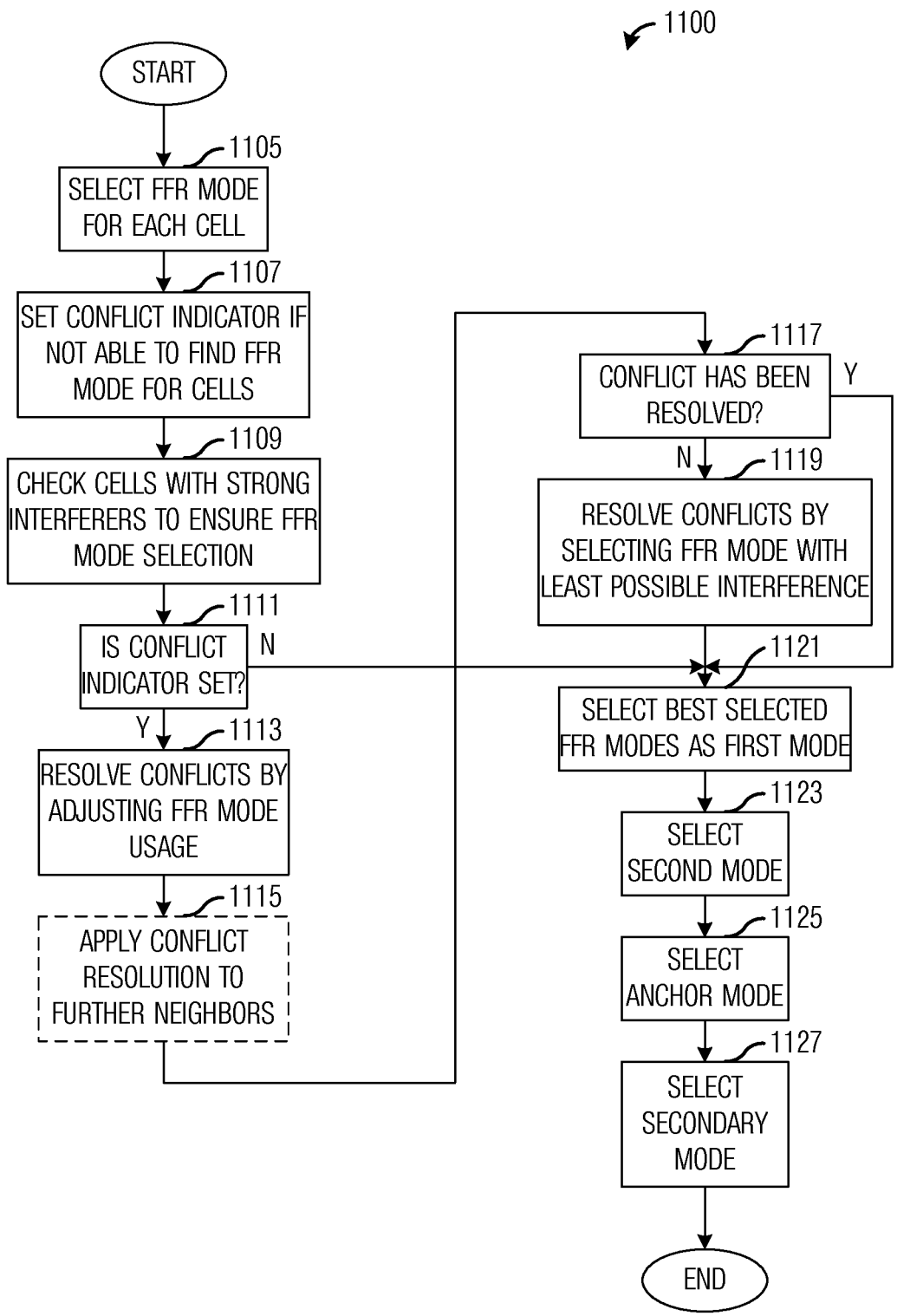
FIG. 11 illustrates an example flow diagram of operations in determining a frequency reuse mode assignment in a centralized manner according to example embodiments described herein.

FIG. 11 illustrates a flow diagram of operations 1100 in determining a frequency reuse mode assignment in a centralized manner. Operations 1100 may be indicative of operations occurring in an ICIC controller, such as a cluster controller, a higher cluster controller, or a global ICIC controller, as the ICIC controller determines a frequency reuse mode assignment using one of the assignment techniques presented in FIG. 10*b*. Operations 1100 may occur while the ICIC controller is in a normal operating mode.

Operations 1100 may begin with the ICIC controller selecting a frequency reuse mode for each cell (block 1105). According to an example embodiment, the ICIC controller may select a frequency reuse mode for each cell out of a number of possible frequency reuse modes, such as three, six, or so on. The ICIC controller may select frequency reuse modes so that neighbor nodes do not share the same frequency reuse mode. A more rigorous selection may require that higher order neighbor nodes do not share the same frequency reuse mode.

If the ICIC controller is unable to select a frequency reuse mode for each cell without conflict, then a conflict indicator may be set (block 1107). The conflict indicator may be used to indicate that the ICIC controller was unable to select a non-conflicting frequency reuse mode for at least one of the cells.

The ICIC controller may go back through the frequency reuse mode selections to ensure that cells with strong interferers are not in conflict with their strong interferers (block 1109). If the ICIC controller is unable to resolve conflicts between the cells and their strong interferers, then the conflict indication may be set. Ensuring that conflicts do not occur between cells and their strong interferers may be important, especially for sequential, neighbor size A, and neighbor size B assignment techniques.

The ICIC controller may perform a check to determine if the conflict indicator is set to indicate that a conflict has occurred (block 1111). If the conflict indicator indicates that a conflict has occurred, then the ICIC controller may perform conflict resolution. If the conflict indicator indicates that a conflict has not occurred, then the ICIC controller may skip conflict resolution.

Conflict resolution may include the ICIC controller resolving conflicts by adjusting frequency reuse mode selections (block 1113). As an example, the ICIC controller may adjust frequency reuse mode selections for a cell (where the conflict is occurring) and its neighborhood group. As an example, the ICIC controller may change frequency reuse mode selections for the cell and cells in its neighborhood group to resolve the conflict. If conflict resolution is not resolved among the cell and its first-tier neighbor cells, the ICIC controller may extend conflict resolution to second-tier neighbor cells (and beyond) of the cell (block 1115).

The ICIC controller may perform a check to determine if the conflict has been resolved (block 1117). For example, the ICIC controller may check to determine if the conflict indicator is no longer set to indicate that a conflict exists. If the conflict has been resolved, then conflict resolution is complete. If the conflict has not been resolved, then the ICIC controller may be unable to resolve the conflict by selecting non-overlapping frequency reuse modes. Instead, the ICIC controller may have to settle for frequency reuse modes that result in minimum interference. The ICIC controller may resolve the conflict by selecting frequency reuse modes that cause minimal interference with the cell (block 1119). Alternatively, the ICIC controller may resolve the conflict by selecting frequency reuse modes that cause minimum interference with some or all of the cells in the neighborhood group.

If there was no conflict (block 1111) or if conflict resolution has been successfully completed, then the ICIC controller may select the frequency reuse mode selections made by the ICIC controller with the best performance as a first mode (block 1121). For example, a frequency reuse mode's performance may be quantified by a performance metric, including: frequency reuse mode selection success rate with no conflicts (first priority where the higher the better); and cell perceived residue interference (if selection success rate is not 100 percent, the smaller the better).

The ICIC controller may select a second mode (block 1123). According to an example embodiment, the ICIC controller may select a second mode for each cell based on unassigned and available frequency reuse modes for each cell. The available frequency reuse modes (and/or bandwidth) may be shared among the cell's neighbors.

From the first mode and the second mode, the ICIC controller may select an anchor mode (block 1127). From the two modes assigned to each cell, the ICIC controller may choose one mode as the anchor mode by further optimizing second-tier neighbor cell interference sources, based on, e.g., an interference limit applied to earlier frequency reuse mode selection or geometry information.

The ICIC control may select a secondary mode (block 1129). The selection of the secondary mode may be based on an optimized criterion, such as cell traffic loading, fair share on demand, or so on. The selection of the secondary mode may result in an optimized static ICIC frequency reuse mode configuration.

Figure 12:
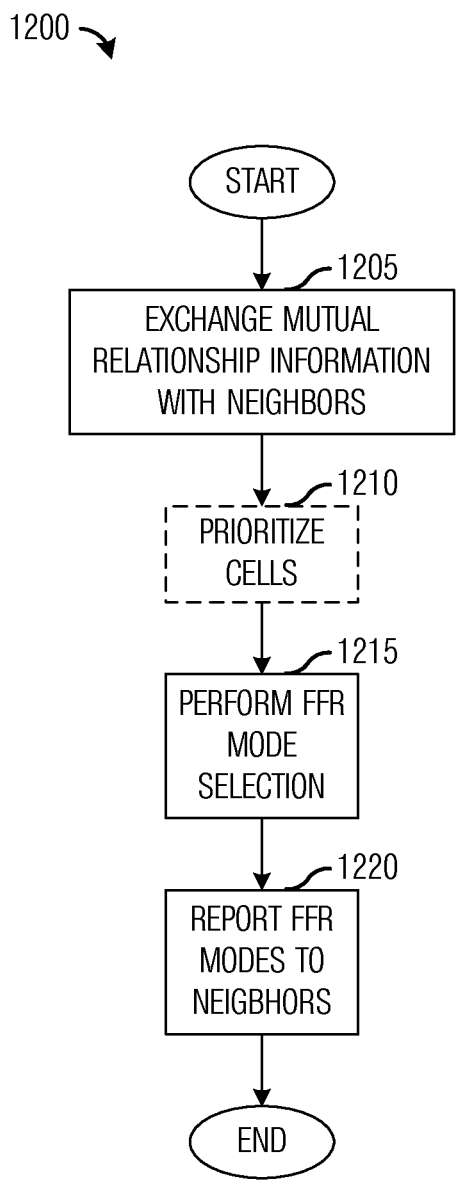
FIG. 12 illustrates an example flow diagram of operations in ICIC frequency reuse mode optimization in a distributed manner according to example embodiments described herein.

FIG. 12 illustrates a flow diagram of operations 1200 in ICIC frequency reuse mode optimization in a distributed manner. Operations 1200 may be indicative of operations occurring in an ICIC controller, such as an eNB, as the ICIC controller performs ICIC frequency reuse mode optimization to meet changing operating conditions. Operations 1200 may occur while the ICIC controller is in a normal operating mode.

Operations 1200 may begin with the ICIC controller exchanging mutual relationship information with other ICIC controllers (block 1205). If the ICIC controller is a cell, then the cell may exchange mutual relationship information with other cells if their inter-cell interfaces are provided, if the ICIC controller is a cluster ICIC controller or a higher cluster ICIC controller, the cluster ICIC controller or the higher ICIC controller may receive mutual relationship information from the cells and exchange mutual relationship information with other cluster ICIC controllers or higher ICIC controllers. If the ICIC controller is a global ICIC controller, then the global ICIC controller may receive mutual relationship information from the cells or lower-level cluster ICIC controller, such as a cluster ICIC controller or a higher cluster ICIC controller.

The ICIC controller may optionally prioritize the cells (block 1210). According to an example embodiment, the ICIC controller may prioritize the cells based on the amount of interference that the cells receive, and select ICIC frequency reuse modes for the cells with the most interference, for example. Furthermore, the cells with the most interference may also be given priority when there are conflicts in selected ICIC frequency reuse modes. Other factors that may be used in conflict resolution include UE priority, UE distribution, geographical information, cell priority, and so on.

The ICIC controller may perform frequency reuse mode selection for itself based on a predefined timing that may specify which ICIC controller may go first, second, etc. (block 1215). The predefined timing may be based on the prioritized list of cells. According to an example embodiment, the ICIC controller may perform the frequency reuse mode selection for its own sectors, with an individual sector ordering that may be based on interference level of the sectors.

The ICIC controller may report the ICIC frequency reuse modes selected for the sectors to the neighbor cells (block 1220). As an example, the ICIC controller, such as a cell, may inform its neighboring cells using its inter-cell interface. An additional signaling between the cells may be needed for conflict resolution and secondary mode assignment. The communications system may resume normal operations.

According to an example embodiment, distributed ICIC frequency reuse mode optimization may be used in situations with and without cluster ICIC controllers. If cluster ICIC controllers are not used or are not available, then an eNB may perform ICIC frequency reuse mode optimization by sharing mutual relationship information with other eNBs through an inter-eNB interface. However, if cluster ICIC controllers are available and are used, the cluster ICIC controllers may provide slow but more optimal ICIC configuration and optimization. The ICIC controllers may be used in conjunction with or in lieu of the eNBs.

Figure 13:
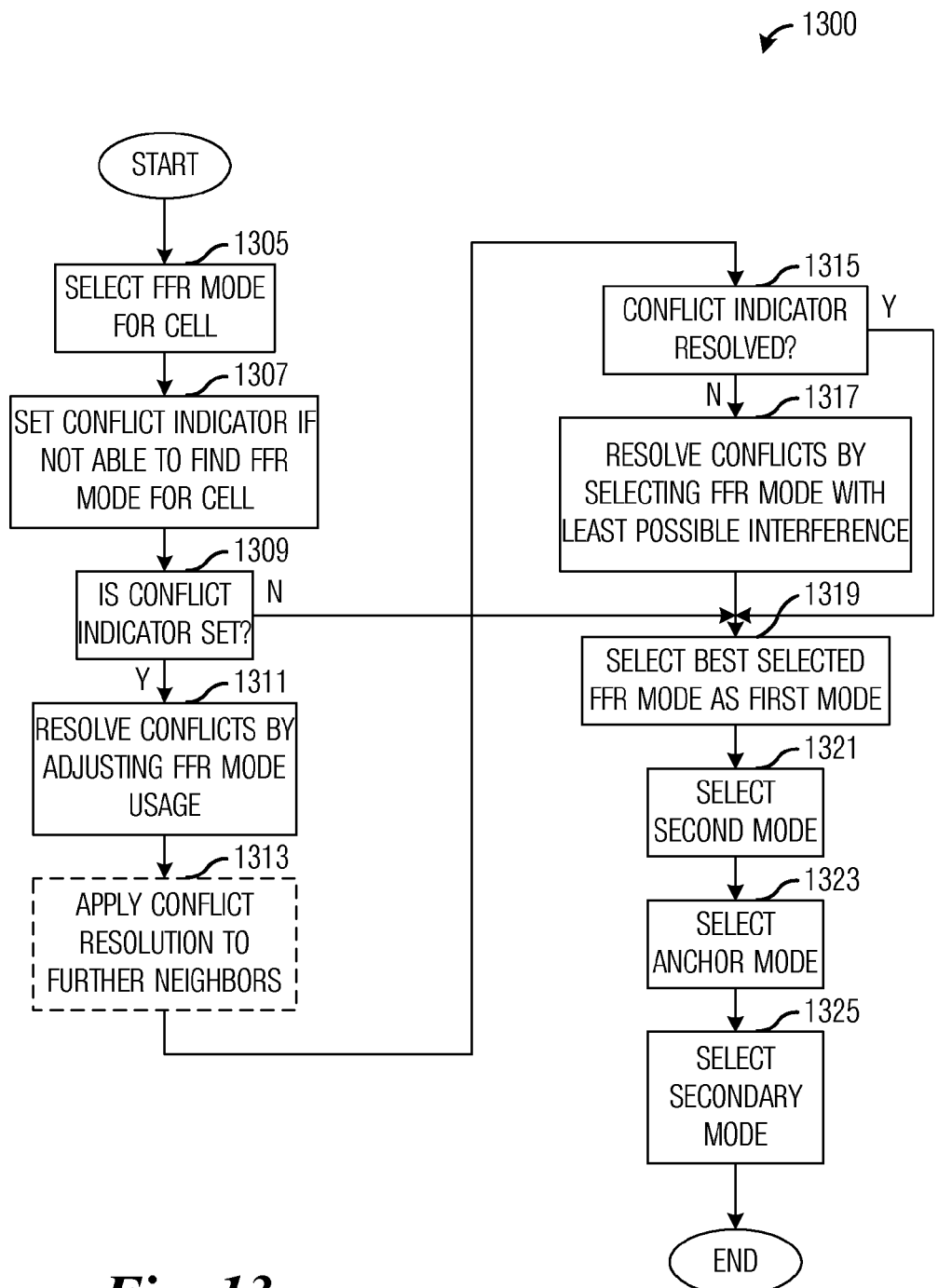
FIG. 13 illustrates an example flow diagram of operations in determining a frequency reuse mode assignment in a distributed manner according to example embodiments described herein.

FIG. 13 illustrates a flow diagram of operations 1300 in determining a frequency reuse mode assignment in a distributed manner. Operations 1300 may be indicative of operations occurring in an ICIC controller, such as an eNB, as the ICIC controller determines a frequency reuse mode assignment. Operations 1300 may be a detailed implementation of block 1215 of FIG. 12. Operations 1300 may occur while the ICIC controller is in a normal operating mode.

Operations 1300 may begin with the ICIC controller selecting a frequency reuse mode for each of its cell(s) based on neighbor lists (block 1305). According to an example embodiment, the ICIC controller may select a frequency reuse mode for each cell out of a number of possible frequency reuse modes, such as three, six, or so on. The ICIC controller may select frequency reuse modes so that neighbor cells do not share the same frequency reuse mode. A more rigorous selection may require that higher order neighbor cells do not share the same frequency reuse mode.

If the ICIC controller is unable to select a frequency reuse mode for each cell without conflict, then a conflict indicator may be set (block 1307). The conflict indicator may be used to indicate that the ICIC controller was unable to select a non-conflicting frequency reuse mode for at least one of the cells.

The ICIC controller may reduce the size of the neighbor lists by setting limits on interference and/or maximum number of entries in the neighbor lists.

The ICIC controller may perform a check to determine if the conflict indicator is set to indicate that a conflict has occurred (block 1309). If the conflict indicator indicates that a conflict has occurred, then the ICIC controller may perform conflict resolution. If the conflict indicator indicates that a conflict has not occurred, then the ICIC controller may skip conflict resolution.

Conflict resolution may include the ICIC controller resolving conflicts by adjusting frequency reuse mode selections (block 1311). As an example, the ICIC controller may adjust frequency reuse mode selections for a cell (where the conflict is occurring) and its neighborhood group of cells. As an example, the ICIC controller may change frequency reuse mode selections for the cell and cells in its neighborhood group to resolve the conflict. If conflict resolution is not resolved among the cell and its first-order neighbor cells, the ICIC controller may extend conflict resolution to second-order neighbor cells (and beyond) of the cell (block 1313).

The ICIC controller may perform a check to determine if the conflict has been resolved (block 1315). For example, the ICIC controller may check to determine if the conflict indicator is no longer set to indicate that a conflict exists. If the conflict has been resolved, then conflict resolution is complete. If the conflict has not been resolved, then the ICIC controller may be unable to resolve the conflict by selecting non-overlapping frequency reuse modes. Instead, the ICIC controller may have to settle for frequency reuse modes that result in minimum interference. The ICIC controller may resolve the conflict by selecting frequency reuse modes that cause minimal interference with the cell (block 1317). Alternatively, the ICIC controller may resolve the conflict by selecting frequency reuse modes that cause minimum interference with some or all of the cells in the neighborhood group.

If there was no conflict (block 1309) or if conflict resolution has been successfully completed, then the ICIC controller may select the frequency reuse mode selections made by the ICIC controller with the best performance as a first mode (block 1319). For example, a frequency reuse mode's performance may be quantified by a performance metric, including: frequency reuse mode selection success rate (first priority where the higher the better); and cell perceived residue interference (if selection success rate is not 100 percent, the smaller the better).

The ICIC controller may select a second mode (block 1321). According to an example embodiment, the ICIC controller may select a second mode for each cell based on unassigned and available frequency reuse modes for each cell. The available frequency reuse modes (and/or bandwidth) may be shared among the cell's neighbors.

From the first mode and the second mode, the ICIC controller may select an anchor mode (block 1323). From the two modes assigned to each cell, the ICIC controller may choose one mode as the anchor mode by further optimizing second-tier neighbor cell interference sources, based on, e.g., an interference limit applied to earlier frequency reuse mode selection or geometry information.

The ICIC control may select a secondary mode (block 1325). The selection of the secondary mode may be based on an optimized criterion, such as cell traffic loading, fair share on demand, or so on. The selection of the secondary mode may result in an optimized static ICIC frequency reuse mode configuration.

Figure 14B:
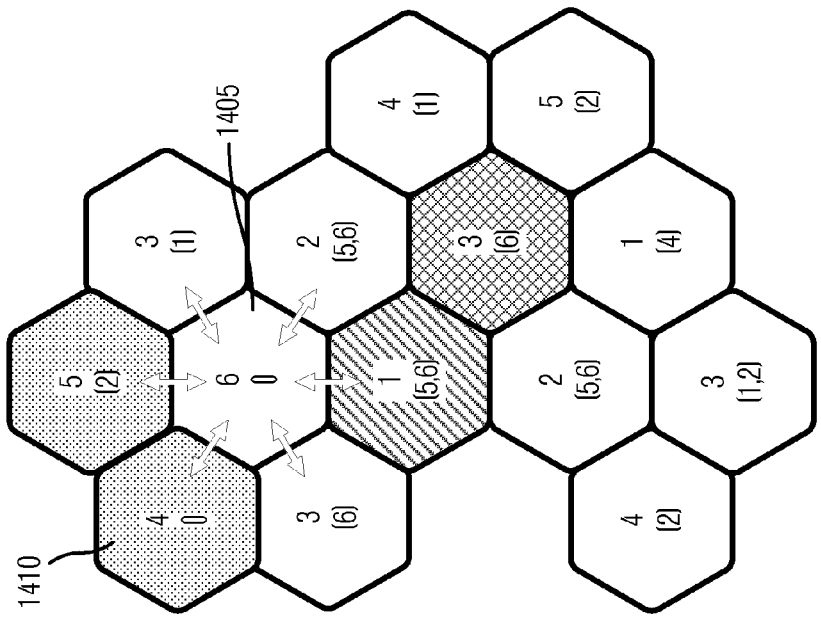
FIGS. 14a and 14b illustrate an example first conflict resolution example according to example embodiments described herein.
Figure 14A:
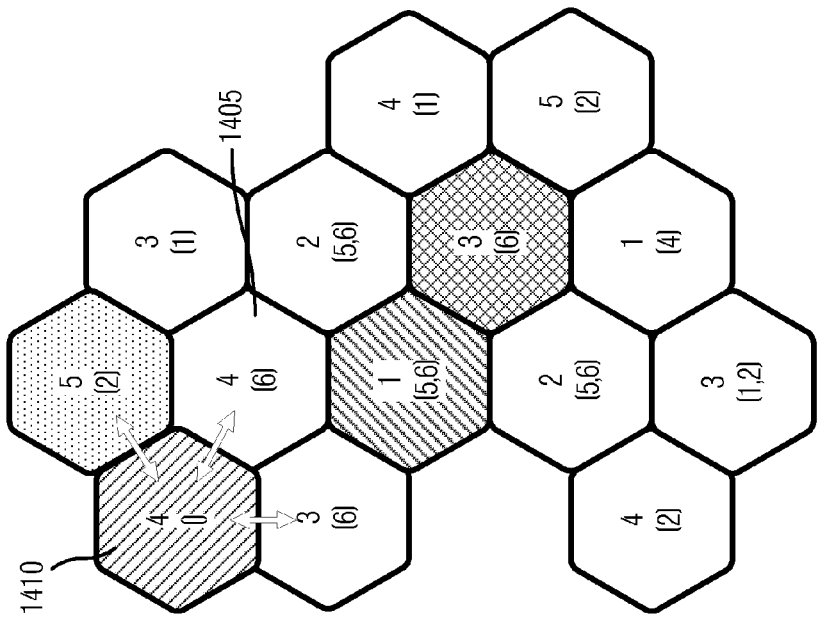

FIGS. 14a and 14b illustrate a first conflict resolution example. As shown in FIG. 14a, a conflict in frequency reuse modes exist between cell 1405 and cell 1410, where frequency reuse mode 4 is selected for both cells. In FIG. 14b, after conflict resolution, the frequency reuse mode for cell 1405 has been changed to frequency reuse mode 6 and the conflict has been resolved.

Figure 15C:
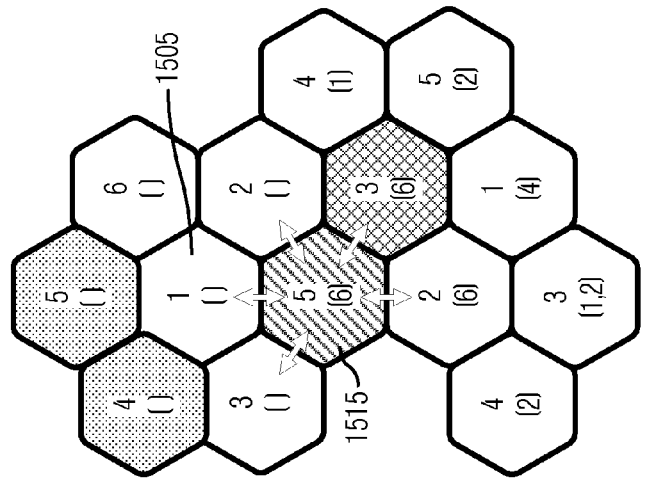
FIGS. 15a, 15b, and 15c illustrate an example second conflict resolution example according to example embodiments described herein.
Figure 15B:
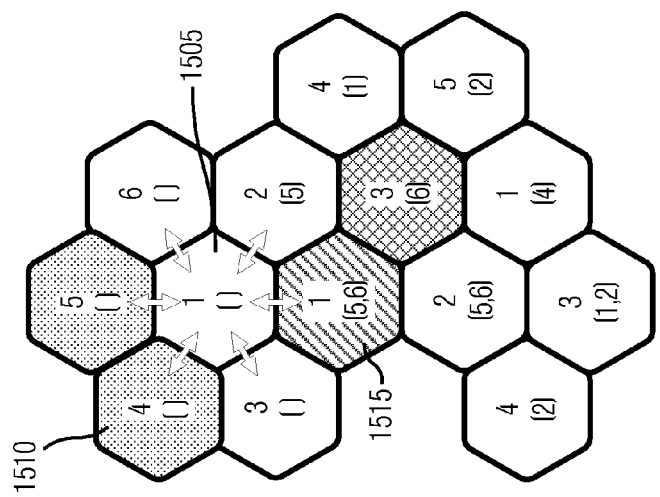
Figure 15A:
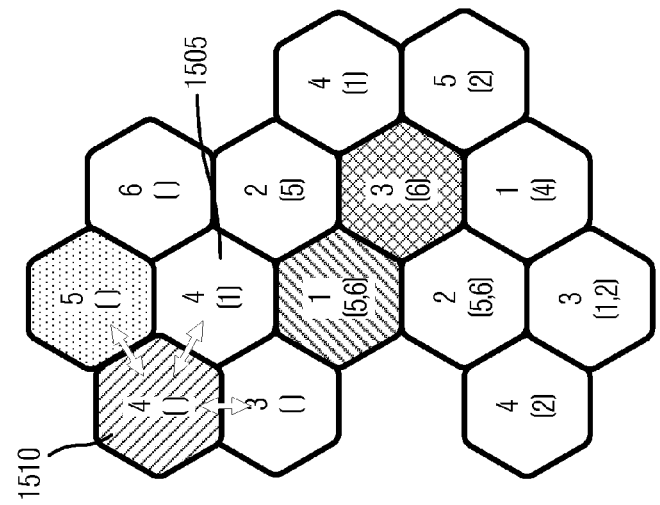

FIGS. 15a, 15b, and 15c illustrate a second conflict resolution example. As shown in FIG. 15a, a conflict in frequency reuse modes exist between cell 1505 and cell 1510, where frequency reuse mode 4 is selected for both cells. In FIG. 15b, after partial conflict resolution, the frequency reuse mode for cell 1505 has been changed to frequency reuse mode 1 and the conflict between cell 1505 and cell 1510 has been resolved. However, frequency reuse mode 1 for cell 1505 conflicts with the frequency reuse mode of cell 1515. Therefore, conflict resolution may need to continue. In FIG. 15c, the frequency reuse mode for cell 1515 has been changed to frequency reuse mode 5, so there is no longer a conflict between cell 1505 and cell 1515.

Figure 16A:
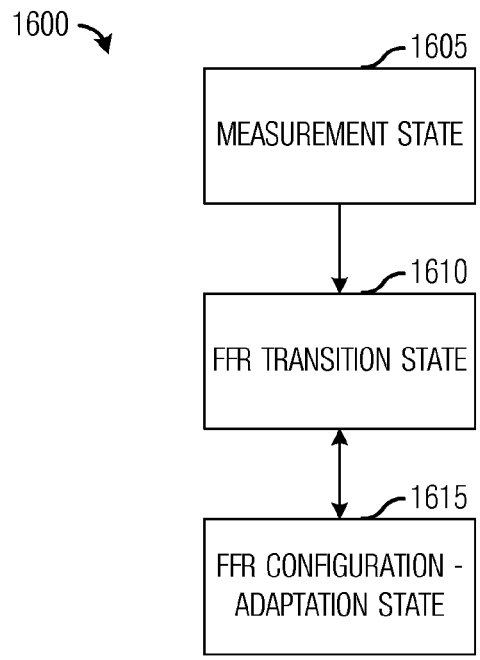
FIG. 16a illustrates an example state diagram of power control for ICIC initialization and adaptation according to example embodiments described herein.

FIG. 16a illustrates a state diagram 1600 of power control for ICIC initialization and adaptation. State diagram 1600 may be indicative of state transitions occurring in a cell as the cell transmits and performs ICIC initialization and adaptation.

As shown in FIG. 16a, state diagram 1600 includes three states: a measurement state 1605, a FFR transition state 1610, and a FFR configuration and adaptation state 1615. Measurement state 1605 may be a starting state for a cell, such as when the cell is initially powered on, after reset, or so forth. In measurement state 1605, the cell(s) may operate in a reuse-1 mode with a power density set at a low power band. As the cell(s) transmit, UEs in other cells may be making measurements to measure interference from neighboring cells. As an example, the UEs in the other cells may measure interference using RSRP measurements. Information from the measurements may be used in later ICIC configuration and optimization.

FFR transition state 1610 may begin once the frequency reuse modes have been configured, such as in measurement state 1605 and/or FFR configuration and adaptation state 1615. According to an example embodiment, in FFR transition state 1610, the transmit power density for UEs scheduled in a high power band may be changed. The UEs may be informed through signaling, such as radio resource control signaling. However, since radio resource control signaling may take some time to take place, the UE's transmit power may not be change quickly. Therefore, before the UE gets its new power settings, the cell may not change the transmit power to the UE, except for UEs using quadrature phase shift keying modulation, where the transmit power to the UEs may be changed prior to the UEs actually receiving the signaling. In general, FFR transition state 1610 may allow for changing of transmit power based on the FFR configuration, either through signaling for UEs not using quadrature phase shift keying modulation or directly changing the transmit power for UEs using quadrature phase shift keying modulation.

Figure 16B:
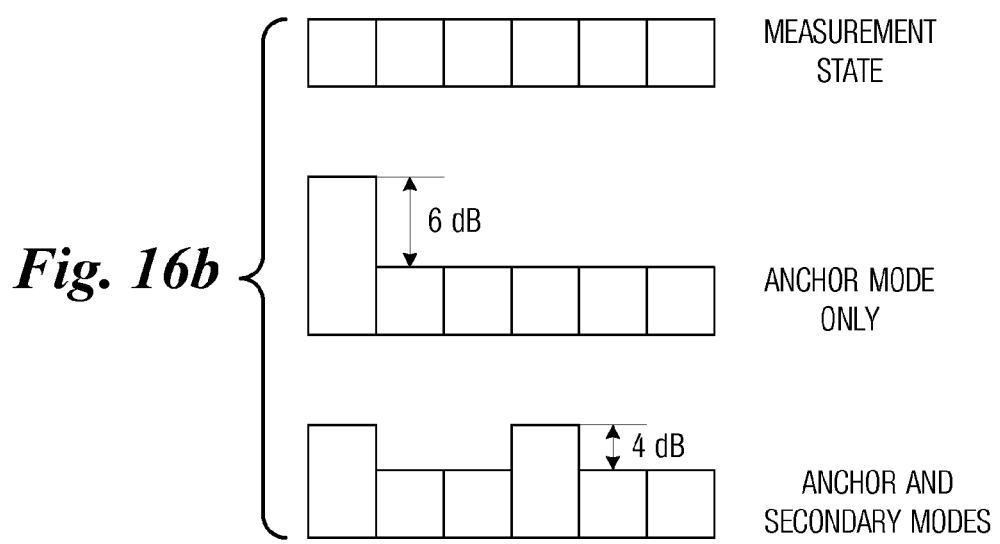
FIG. 16b illustrates an example transmit power levels for different cell states according to example embodiments described herein.

After changing the UE power settings, normal operations (transmitting and/or receiving) typically take place in FFR configuration and adaptation state 1615. The cells may operate in anchor mode and/or secondary mode, with their transmit power levels set accordingly. FIG. 16b illustrates exemplary transmit power levels for different cell states. When the cell is in measurement state 1605, the cell transmits within all available frequency ranges at a relatively low power level. When the cell is in FFR configuration and adaptation state 1615 and is operating in anchor mode only, the cell may transmit according to a selected frequency reuse mode at a high power level. When the cell is in FFR configuration and adaptation state 1615 and is operating in both anchor mode and secondary mode, the cell may transmit according to a selected frequency reuse mode at a power level that is lower than the transmit power level while it is operating only in the anchor mode but higher than when it is in measurement state 1605.

While in FFR configuration and adaptation state 1615, if conditions change (for example, changes in interference relationships with neighbor cells, changes communications system traffic patterns, changes in error rates, changes in handover failures, and so forth) and ICIC configuration and optimization is to be performed, the cells may transition back to FFR transition state 1610 and adjust the transmit power levels based on changes in ICIC configuration.

Figure 17:
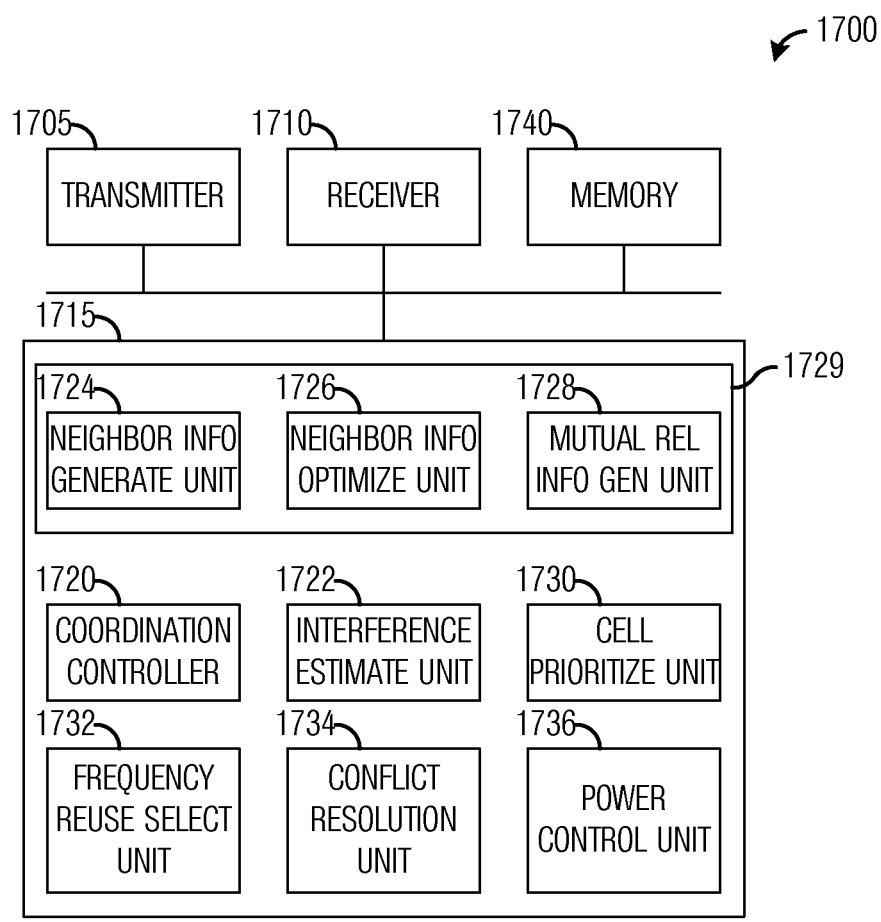
FIG. 17 provides an example communications device according to example embodiments described herein.

FIG. 17 provides an alternate illustration of a communications device 1700. Communications device 1700 may be an implementation of an ICIC controller, such as an eNB, a cluster ICIC controller, a higher cluster ICIC controller, or a global ICIC controller. Communications device 1700 may be used to implement various ones of the embodiments discussed herein. As shown in FIG. 17, a transmitter 1705 is configured to transmit information and a receiver 1710 is configured to receive information.

A coordination controller 1720 is configured to control coordination between ICIC controllers, such as sharing frequency reuse information, mutual relationship information, neighbor information, priority information, and so forth. An interference estimate unit 1722 is configured to estimate interference at UEs based on signal power measurement reports, e.g., RSRP reports, from the UEs, Interference estimate unit 1722 is further configured to make use of other information, such as channel quality information, UE categorization, geographical information, and so forth, in estimating interference.

A neighbor information generate unit 1724 is configured to generate neighbor information from the estimated interference, as well as other information, such as channel quality information, UE categorization, geographical information, and so forth. A neighbor information optimize unit 1726 is configured to optimize the neighbor information generated by neighbor information generate unit 1724. Neighbor information optimize unit 1726 may optimize the neighbor information by sorting the neighbor information (by level of interference, priority, or so on), eliminating entries from the sorted neighbor information (for example, entries below a specified interference threshold may be eliminated, only a specified number of highest interferers may be kept, etc.), and so on. A mutual relationship information generate unit 1728 is configured to generate mutual relationship information from the neighbor information (possibly after optimization of the neighbor information). Mutual relationship information generate unit 1728 may generate the mutual relationship information from the neighbor information using information from neighbor information from neighboring cells, other ICIC controllers, and so on. Collectively, neighbor information generate unit 1724, neighbor information optimize unit 1726, and mutual relationship information generate unit 1728 form a relationship information generate unit 1729.

A cell prioritize unit 1730 is configured to prioritize cells based on factors such as interference (e.g., maximum interference, averaged interference, weighted interference, and so forth), geographical information, UE distribution, etc. A frequency reuse select unit 1732 is configured to select frequency reuse modes, optimize frequency reuse modes, or a combination thereof, for cells based on the mutual relationship information, neighbor information from neighboring cells and ICIC controllers, and so on. Frequency reuse select unit 1732 is further configured to optimize existing frequency reuse modes based on the mutual relationship information, neighbor information from neighboring cells and ICIC controllers, and so on. Conflict resolution unit 1734 is configured to resolve conflicts in selected frequency reuse modes by considering factors such as UE priority, UE distribution, geographical information, cell priority, cell interference, and so forth. A power control unit 1736 is configured to adjust transmission power levels for scheduled UEs based on an operating mode of communications device 1700, as well as a modulation mode of the UE. Furthermore, power control unit 1736 may adjust transmission power levels based on a power control state of communications device 1700. A memory 1740 is configured to store ICIC information, selected frequency reuse modes, signal power measurement reports, neighbor information, mutual relationship information, exchanged information, prioritized cell lists, power control information, and so on.

The elements of communications device 1700 may be implemented as specific hardware logic blocks. In an alternative, the elements of communications device 1700 may be implemented as software executing in a processor, controller, application specific integrated circuit, or so on. In yet another alternative, the elements of communications device 1700 may be implemented as a combination of software and/or hardware.

As an example, receiver 1710 and transmitter 1705 may be implemented as a specific hardware block, while coordination controller 1720, interference estimate unit 1722, relationship information generate unit 1729 (neighbor information generate unit 1724, neighbor information optimize unit 1726, and mutual relationship information generate unit 1728), cell prioritize unit 1730, frequency reuse select unit 1732, conflict resolution unit 1734, and power control unit 1736 may be software modules executing in a microprocessor (such as processor 1715), a custom circuit, a custom compiled logic array of a field programmable logic array, or combinations thereof.

The above described embodiments of communications system 300, communications system 400, and communications device 1700 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the description of the flow diagrams(s) for FIGS. 7, 8, 9, 10*a*, 10*b*, 11, 12, 13, and 16*a*—is used to indicate the desired specific use (or non-use) of such terms.

Advantageous features of embodiments of the invention may include: A method for controller operations, the method comprising: determining a group of frequency reuse modes; assigning at least one frequency reuse mode to a controller based on mutual relationship information, wherein the at least one frequency reuse mode is from the group of frequency reuse modes; and sharing the at least one frequency reuse mode with communications controllers coupled to the controller.

The method could further include, wherein exchanging relationship information comprises: transmitting a first type of relationship information to the communications controllers; and receiving a second type of relationship information from the communications controllers, wherein the first type of relationship information comprises relationship information from the controller, and wherein the second type of relationship information comprises relationship information from the communications controllers.

The method could further include, further comprising adjusting the first type of relationship information based on the second type of relationship information.

The method could further include, wherein the selecting the at least one frequency reuse mode comprises determining a frequency reuse mode assignment based on an assignment technique, wherein determining a frequency reuse mode assignment based on an assignment technique comprises: selecting a frequency reuse mode for the controller, wherein the frequency reuse mode selected for the controller does not overlap with frequency reuse modes selected for its neighboring communications controllers; resolving conflicts the frequency reuse mode selected for the controller is not a non-overlapping frequency reuse mode with at least one neighboring communications controller; selecting a first frequency reuse mode for the controller from the selected frequency reuse modes based on a metric; and selecting a second frequency reuse mode for the controller from unselected frequency reuse modes from the selected frequency reuse modes.

The method could further include, wherein the metric comprises frequency reuse mode selection success rate, and perceived residue interference at a communications controller, or combinations thereof.

The method could further include, wherein the optimizing occurs at a different controller.

Advantageous features of embodiments of the invention may include: A controller comprising: a frequency reuse select unit configured to determine a group of frequency reuse modes, and to assign at least one frequency reuse mode to a controller based on mutual relationship information, wherein the at least one frequency reuse mode is from the group of frequency reuse modes; and a transmitter coupled to the frequency reuse select unit, the transmitter configured to share the at least one frequency reuse mode with communications controllers coupled to the controller.

The method could further include, further comprising: a receiver configured to receive relationship information; a coordination controller coupled to the receiver, the coordination controller configured to exchange relationship information with communications controllers coupled to the controller; and a relationship information generate unit coupled to the coordination controller, the relationship information generate unit configured to determine the mutual relationship information based on the relationship information, wherein the frequency reuse select unit is further coupled to the relationship information generate unit, and wherein the frequency reuse select unit is further configured to select the at least one frequency reuse mode for the controller based on the mutual relationship information.

The method could further include, wherein the relationship information comprises neighbor cell lists, and wherein the relationship information generate unit comprises: a neighbor information optimize unit configured to optimize the neighbor cell lists; and a mutual relationship information unit coupled to the neighbor information optimize unit, the mutual relationship information unit configured to generate the mutual relationship information based on the optimized neighbor cell lists.

The method could further include, wherein the mutual relationship information unit is further configured to apply weights to the mutual relationship information.

The method could further include, wherein the frequency reuse select unit determines a frequency reuse mode assignment based on an assignment technique.

The method could further include, wherein the frequency reuse select unit determines a frequency reuse mode assignment by, selecting a frequency reuse mode for each communications controller, wherein the frequency reuse mode selected for a communications controller does not overlap with frequency reuse modes selected for its neighboring communications controllers; resolving conflicts if at least one communications controller is not assigned a non-overlapping frequency reuse mode; selecting a first frequency reuse mode for each communications controller from the selected frequency reuse modes based on a metric; and selecting a second frequency reuse mode for each communications controller from unselected frequency reuse modes from the selected frequency reuse modes.

The method could further include, wherein the frequency reuse select unit resolves conflicts by adjusting the selected frequency reuse modes for the at least one communications controller and its neighbor communications controllers Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for controller operations, the method comprising:
   determining a group of frequency reuse modes;
   assigning at least one frequency reuse mode to a controller in accordance with mutual relationship information, wherein the at least one frequency reuse mode is from the group of frequency reuse modes, wherein assigning the at least one frequency reuse mode comprises
      exchanging relationship information with communications controllers;
      determining the mutual relationship information in accordance with the relationship information; and
      selecting the at least one frequency reuse mode for the controller in accordance with the mutual relationship information; and
   sharing the at least one frequency reuse mode with the communications controllers coupled to the controller.

2. The method of claim 1, wherein exchanging relationship information comprises receiving the relationship information from the communications controllers, and wherein selecting the at least one frequency reuse mode for the controller further comprises selecting frequency reuse modes for the communications controllers coupled to the controller.

3. The method of claim 2, wherein the relationship information comprises neighbor cell lists, and wherein determining the mutual relationship information comprises:
optimizing the neighbor cell lists; and
generating the mutual relationship information in accordance with the optimized neighbor cell lists.

4. The method of claim 3, wherein determining mutual relationship information further comprises weighting the mutual relationship information.

5. The method of claim 3, wherein optimizing the neighbor cell lists comprises:
removing entries in the neighbor cell lists with interference levels below an interference threshold;
retaining i entries in the neighbor cell lists with highest interference levels, wherein i is a specified integer value; or
sorting the neighbor cell lists.

6. The method of claim 2, wherein selecting the at least one frequency reuse mode comprises determining a frequency reuse mode assignment in accordance with an assignment technique.

7. The method of claim 6, wherein there is a plurality of assignment techniques, and selecting the at least one frequency reuse mode comprises:
for each assignment technique, determining a frequency reuse mode assignment for the assignment technique, thereby producing a frequency reuse mode assignment associated with the assignment technique; and
selecting the frequency reuse mode assignment from a plurality of frequency reuse mode assignments associated with the plurality of assignment techniques.

8. The method of claim 7, wherein selecting the frequency reuse mode assignment is in accordance with a frequency reuse mode selection criteria, and wherein the frequency reuse mode selection criteria comprises lowest maximum perceived interference at any cell, lowest average perceived interference at all cells, lowest maximum interference caused, lowest average interference caused, lowest maximum weighted interference at any cell, lowest maximum weighted interference caused, or combinations thereof.

9. The method of claim 6, wherein determining a frequency reuse mode assignment in accordance with an assignment technique comprises:
selecting a frequency reuse mode for each communications controller, wherein the frequency reuse mode selected for the communications controller does not overlap with frequency reuse modes selected for its neighboring communications controllers;
resolving conflicts when at least one communications controller is not assigned a non-overlapping frequency reuse mode;
selecting a first frequency reuse mode for each communications controller from the selected frequency reuse modes in accordance with a metric; and
selecting a second frequency reuse mode for each communications controller from unselected frequency reuse modes from the selected frequency reuse modes.

10. The method of claim 9, wherein the metric comprises frequency reuse mode selection success rate, perceived residue interference at a communications controller, or combinations thereof.

11. The method of claim 9, wherein selecting a frequency reuse mode further comprises prioritizing the selecting a frequency reuse mode for communications controllers with strongest interferers.

12. The method of claim 9, wherein determining a frequency reuse mode assignment in accordance with an assignment technique further comprises:
selecting an initial one of either the first frequency reuse mode or the second frequency reuse mode for a communications controller as an anchor mode for the communications controller in accordance with interference caused to neighboring communications controllers; and
selecting a remaining one of either the first frequency reuse mode or the second frequency reuse mode for the communications controller as a secondary mode for the communications controller.

13. The method of claim 9, wherein resolving conflicts comprises adjusting the selected frequency reuse modes for the at least one communications controller and its neighbor communications controllers.

14. The method of claim 13, wherein resolving conflicts further comprises selecting an alternate frequency reuse mode for the at least one communications controller, wherein the alternate frequency reuse mode minimizes interference to its neighboring communications controllers.

15. The method of claim 1, wherein exchanging relationship information comprises:
transmitting a first type of relationship information to the communications controllers; and
receiving a second type of relationship information from the communications controllers,
wherein the first type of relationship information comprises relationship information from the controller, and
wherein the second type of relationship information comprises relationship information from the communications controllers.

16. The method of claim 15, wherein the selecting the at least one frequency reuse mode occurs in accordance to a predefined timing.

17. The method of claim 15, wherein the selecting the at least one frequency reuse mode comprises determining a frequency reuse mode assignment in accordance with an assignment technique, and wherein determining a frequency reuse mode assignment in accordance with an assignment technique comprises:
selecting a frequency reuse mode for the controller, wherein the frequency reuse mode selected for the controller does not overlap with frequency reuse modes selected for its neighboring communications controllers;
resolving conflicts the frequency reuse mode selected for the controller is not a non-overlapping frequency reuse mode with at least one neighboring communications controller;
selecting a first frequency reuse mode for the controller from the selected frequency reuse modes in accordance with a metric; and
selecting a second frequency reuse mode for the controller from unselected frequency reuse modes from the selected frequency reuse modes.

18. The method of claim 17, wherein determining a frequency reuse mode assignment in accordance with an assignment technique further comprises:
selecting one of either the first frequency reuse mode or the second frequency reuse mode for the controller as an anchor mode for the controller in accordance with interference caused to neighboring communications controllers; and selecting the other of either the first frequency reuse mode or the second frequency reuse mode for the controller as a secondary mode for the controller.

19. A method for controller operations, the method comprising:

determining a group of frequency reuse modes;

assigning at least one frequency reuse mode to a controller in accordance with mutual relationship information, wherein the at least one frequency reuse mode is from the group of frequency reuse modes; and sharing the at least one frequency reuse mode with communications controllers coupled to the controller, wherein the at least one frequency reuse mode comprises a first frequency reuse mode and a second frequency reuse mode, and wherein the second frequency reuse mode is used when additional transmission bandwidth is desired.

20. A method for controller operations, the method comprising:

determining a group of frequency reuse modes;

assigning at least one frequency reuse mode to a controller in accordance with mutual relationship information, wherein the at least one frequency reuse mode is from the group of frequency reuse modes;

optimizing the at least one frequency reuse mode in accordance with the mutual relationship information; and sharing the at least one frequency reuse mode with communications controllers coupled to the controller.

21. A controller comprising:

a frequency reuse select unit configured to determine a group of frequency reuse modes, and to assign at least one frequency reuse mode to a controller in accordance with mutual relationship information, wherein the at least one frequency reuse mode is from the group of frequency reuse modes;

a transmitter coupled to the frequency reuse select unit, the transmitter configured to share the at least one frequency reuse mode with communications controllers coupled to the controller;

a receiver configured to receive relationship information;

a coordination controller coupled to the receiver, the coordination controller configured to exchange relationship information with communications controllers coupled to the controller; and a relationship information generate unit coupled to the coordination controller and the frequency reuse select unit, the relationship information generate unit configured to determine the mutual relationship information in accordance with the relationship information, wherein the frequency reuse select unit is further configured to select the at least one frequency reuse mode for the controller in accordance with the mutual relationship information.

22. The controller of claim 21, wherein the frequency reuse select unit is further configured to select frequency reuse modes for the communications controllers coupled to the controller.

23. The controller of claim 21, wherein the relationship information comprises neighbor cell lists, and wherein the relationship information generate unit comprises:

a neighbor information optimize unit configured to optimize the neighbor cell lists; and a mutual relationship information unit coupled to the neighbor information optimize unit, the mutual relationship information unit configured to generate the mutual relationship information in accordance with the optimized neighbor cell lists.

24. The controller of claim 21, wherein the frequency reuse select unit is configured to determine a frequency reuse mode assignment in accordance with an assignment technique.

25. The controller of claim 24, wherein there is a plurality of assignment techniques, and the frequency reuse select unit is configured to determine a frequency reuse mode assignment by, for each assignment technique, determining a frequency reuse mode assignment for the assignment technique, thereby producing a frequency reuse mode assignment associated with the assignment technique, and selecting the frequency reuse mode assignment from a plurality of frequency reuse mode assignments associated with the plurality of assignment techniques.

26. The controller of claim 24, wherein the frequency reuse select unit is configured to determine a frequency reuse mode assignment by, selecting a frequency reuse mode for each communications controller, wherein the frequency reuse mode selected for a communications controller does not overlap with frequency reuse modes selected for its neighboring communications controllers;

resolving conflicts when at least one communications controller is not assigned a non-overlapping frequency reuse mode;

selecting a first frequency reuse mode for each communications controller from the selected frequency reuse modes in accordance with a metric; and selecting a second frequency reuse mode for each communications controller from unselected frequency reuse modes from the selected frequency reuse modes.

27. The controller of claim 21, wherein the transmitter is further configured to transmit a first type of relationship information to the communications controllers, wherein the receiver is further configured to receive a second type of relationship information from the communications controllers, wherein the first type of relationship information comprises relationship information from the controller, and wherein the second type of relationship information comprises relationship information from the communications controllers.

28. The controller of claim 27, wherein the relationship information generate unit is further configured to adjust the first type of relationship information in accordance with the second type of relationship information.

29. The controller of claim 21, wherein the frequency reuse select unit is configured to determine the frequency reuse mode assignment by, selecting a frequency reuse mode for the controller, wherein the frequency reuse mode selected for the controller does not overlap with frequency reuse modes selected for its neighboring communications controllers;

resolving conflicts the frequency reuse mode selected for the controller is not a non-overlapping frequency reuse mode with at least one neighboring communications controller;

selecting a first frequency reuse mode for the controller from the selected frequency reuse modes in accordance with a metric; and selecting a second frequency reuse mode for the controller from unselected frequency reuse modes from the selected frequency reuse modes.

30. The controller of claim 23, wherein the mutual relationship information unit configured to generate the mutual relationship information comprises the mutual relationship information unit configured to weight the mutual relationship information.

31. The controller of claim 23, wherein the neighbor information optimize unit configured to optimize the neighbor cell lists comprises the neighbor information optimize unit configured to:
- remove entries in the neighbor cell lists with interference levels below an interference threshold;
- retain i entries in the neighbor cell lists with highest interference levels, wherein i is a specified integer value; or
- sort the neighbor cell lists.

32. The controller of claim 26, wherein the metric comprises frequency reuse mode selection success rate, perceived residue interference at a communications controller, or combinations thereof.

33. The controller of claim 26, wherein the frequency reuse select unit configured to determine the frequency reuse mode by selecting a frequency reuse mode further comprises the frequency reuse select unit configured to prioritize the selecting a frequency reuse mode for communications controllers with strongest interferers.

34. The controller of claim 26, wherein the frequency reuse select unit configured to determine the frequency reuse mode assignment in accordance with the assignment technique further comprises the frequency reuse select unit configured to:
- select an initial one of either the first frequency reuse mode or the second frequency reuse mode for a communications controller as an anchor mode for the communications controller in accordance with interference caused to neighboring communications controllers; and
- select a remaining one of either the first frequency reuse mode or the second frequency reuse mode for the communications controller as a secondary mode for the communications controller.

35. The controller of claim 26, wherein the frequency reuse select unit configured to determine the frequency reuse mode assignment by resolving conflicts comprises the frequency reuse select unit configured to adjust the selected frequency reuse modes for the at least one communications controller and its neighbor communications controllers.

36. The controller of claim 27, wherein the frequency reuse select unit configured to select the at least one frequency reuse mode further comprises the frequency reuse select unit configured to select the at least one frequency reuse mode in accordance with a predefined timing.

37. The controller of claim 21, wherein the at least one frequency reuse mode comprises a first frequency reuse mode and a second frequency reuse mode, and wherein the controller is configured to use the second frequency reuse mode when additional transmission bandwidth is desired.

38. The controller of claim 21, wherein the frequency reuse select unit is further configured to optimize the at least one frequency reuse mode in accordance with the mutual relationship information.

* * * * *